US008384022B1

(12) United States Patent
Remes et al.

(10) Patent No.: US 8,384,022 B1
(45) Date of Patent: Feb. 26, 2013

(54) METHODS AND APPARATUS FOR CALIBRATING ION TRAP MASS SPECTROMETERS

(75) Inventors: Philip M. Remes, Berkeley, CA (US); Jae C. Schwartz, Gilroy, CA (US)

(73) Assignee: Thermo Finnigan LLC, San Jose, CA (US)

(*) Notice: Subject to any disclaimer, the term of this patent is extended or adjusted under 35 U.S.C. 154(b) by 0 days.

(21) Appl. No.: 13/285,328

(22) Filed: Oct. 31, 2011

(51) Int. Cl.
*B01D 59/44* (2006.01)

(52) U.S. Cl. ..................... 250/282; 250/292; 250/252.1; 702/23; 702/27

(58) Field of Classification Search .................. 250/292, 250/252.1; 702/22–23, 27–32, 85–92, 103–104
See application file for complete search history.

(56) References Cited

U.S. PATENT DOCUMENTS 4,736,101 A 4/1988 Syka et al.
5,298,746 A * 3/1994 Franzen et al. ............... 250/292
5,572,025 A 11/1996 Cotter et al.
7,804,065 B2 * 9/2010 Remes et al. ................. 250/292
2004/0245455 A1 * 12/2004 Reinhold ...................... 250/288
2008/0142705 A1 6/2008 Schwartz et al.
2010/0019143 A1 * 1/2010 Dobson et al. ................ 250/283
2010/0059670 A1 3/2010 Schwartz
2010/0301204 A1 * 12/2010 Koster et al. .................. 250/283
2011/0012013 A1 * 1/2011 Remes et al. .............. 250/252.1
2011/0057095 A1 * 3/2011 Loboda ......................... 250/282

* cited by examiner

*Primary Examiner* — Daniel Whalen
*Assistant Examiner* — James Choi
(74) *Attorney, Agent, or Firm* — Thomas F. Cooney

(57) ABSTRACT

A method of calibrating an ion trap having electrodes to which main RF trapping and resonant ejection voltages are applied comprises: identifying, for each of a plurality of ion types having different respective mass-to-charge ratios, an optimum resonant ejection voltage amplitude at which a mass peak quality is optimized when the ion trap mass analyzer is operated at a selected scan rate; determining a best-fit function of the form $V_{reseject}=m^c(a+bm)$, where $V_{reseject}$ and m represent resonant ejection voltage amplitude and mass-to-charge ratio and a, b and c are constants; identifying, for each of a plurality of ion types, a respective RF voltage amplitude at which ions of each respective type are ejected from the ion trap using a resonant ejection voltage calculated according to the best-fit function; and determining a second best-fit function relating the identified trapping voltage amplitudes to mass-to-charge; ratio.

28 Claims, 22 Drawing Sheets

0.00
-0.15
-0.31
-0.46
-0.62
33.3 kDa / sec
0 200 400 600 800 1000 1200 1400 1600 1800 2000
m / z 0.00
-0.15
-0.31
-0.46
-0.62
-0.77
-0.93
66.6 kDa / sec
0 200 400 600 800 1000 1200 1400 1600 1800 2000
m / z

METHODS AND APPARATUS FOR CALIBRATING ION TRAP MASS SPECTROMETERS

FIELD OF THE INVENTION

The present invention relates generally to ion trap mass spectrometers, and more particularly to methods for operating an ion trap mass spectrometer to optimize peak positions and peak characteristics.

BACKGROUND OF THE INVENTION

Ion trap mass analyzers have been described extensively in the literature (see, e.g., March et al., "Quadrupole Ion Trap Mass Spectrometry", John Wiley & Sons (2005)) and are widely used for mass spectrometric analysis of a variety of substances, including small molecules such as pharmaceutical agents and their metabolites, as well as large biomolecules such as peptides and proteins. Mass analysis is commonly performed in ion traps by the mass-selective resonance ejection method, which has been widely practiced since the late 1980's (e.g., U.S. Pat. No. 4,736,101, titled "Method of operating ion trap detector in MS/MS mode"). In this method, ions of various mass are brought sequentially into resonance with a weak supplementary dipolar AC resonant ejection voltage, $V_{reseject}$. Ions in the trap oscillate with a frequency that depends on the amplitude of the main radio-frequency (RF) trapping voltage $V_{RF}$. Typically, in the resonance ejection method, after application of the resonance ejection voltage, $V_{reseject}$, masses are then brought sequentially into resonance by ramping the trapping voltage amplitude, $V_{RF}$, thereby causing the ions to be ejected from the ion trap to the detector (s) in order of their masses (or mass-to-charge ratios—m/z's). If $V_{RF}$ is varied at a constant rate, then the derivative of mass of ejected ions with respect to time at a particular frequency is nominally constant, and ions of successive mass will be ejected at constant time intervals, i.e. the mass scale will be linear.

In practice, the mass scale of resonantly ejected ions is only approximately linear with respect to $V_{RF}$ when an ion trap is operated as described above. The deviations from linearity are especially pronounced at high rates of scanning $V_{RF}$. Since scanning an ion trap at very fast rates with good mass accuracy is a desirable goal, an improved means of operating the trap or correcting the data post-acquisition is required.

Moreover, one is often principally concerned, in terms of choosing resonant ejection voltage amplitude, with ejecting ion packets having optimal peak characteristics (e.g., U.S. Pat. No. 7,804,065, titled "Methods of calibrating and operating an ion trap mass analyzer to optimize mass spectral peak characteristics" in the names of inventors Remes et al., incorporated herein by reference in its entirety), and then subsequently linearizing the mass scale. Thus, an additional instrument metric of interest is the set of characteristics which comprise a well-formed peak (U.S. Pat. No. 7,804,065). That is to say, the resonant ejection voltage should be scanned with mass in a way that optimizes the shape of the peak. As used herein, peak quality is a value calculated from one or more peak characteristics such as peak height, width, inter-peak valley depth, peak symmetry, spacing of related peaks representing an isotopic distribution and peak position and is representative of the ability of the peak to provide meaningful and accurate qualitative and/or quantitative information regarding the associated ion. The peak quality may be calculated from a set of equations stored in the memory of a control and data system. The peak quality may be calculated in a different fashion for each scan rate.

It is known that the characteristics and quality of a mass spectral peak acquired by resonant ejection will vary with the amplitude of the resonant ejection voltage, and that the amplitude that optimizes certain peak characteristics depends on the m/z of the ejected ion. The prior art contains a number of references that describe methods for varying the resonant ejection voltage amplitude during an analytical scan in order to produce high quality mass spectral peaks across the measured range of m/z's. For example, U.S. Pat. No. 5,298,746 to Franzen et al. ("Method and Device for Control of the Excitation Voltage for Ion Ejection from Ion trap Mass Spectrometers") prescribes controlling the resonant ejection voltage during the analytical scan such that its amplitude is set proportionally to the square root of the main RF trapping voltage amplitude. In another example, U.S. Pat. No. 5,572,025 to Cotter et al. discloses operating an ion trap to maintain a constant ratio between the RF trapping voltage and resonant ejection voltage amplitudes. As another example, the instant inventors, in the aforementioned U.S. Pat. No. 7,804,065, described a method for calibrating an ion trap mass spectrometer including steps of: selecting a phase of the resonant ejection voltage that optimizes a peak quality representative of one or more mass spectral peak characteristics; identifying, for each of a plurality of calibrant ions having different m/z's, a resonant ejection voltage amplitude that optimizes the peak quality when the ion trap is operated at the selected phase; and, deriving a relationship between m/z and resonant ejection voltage amplitude based on the optimized resonant ejection voltage amplitude identified for the plurality of calibrant ions.

Many commercially available ion trap mass spectrometers utilize a calibration procedure in which the resonant ejection voltage amplitude that optimizes one or more peak characteristics (e.g., peak width) is experimentally determined for each of several calibrant ions having different m/z's, and an amplitude calibration is developed by fitting a line to the several (m/z, amplitude) points. Conventionally, it is considered that, to a first approximation, the optimal resonant ejection voltage should be linear with mass, so that ions of each mass have identical rates of approaching the resonance frequency. In practice, however, deviations from linearity are observed, especially at high scan rates. Thus, deviations from linearity are observed not only in the form of the mass dependency of the optimal resonance ejection voltage, but also in the form of the mass dependency of the scanned trapping voltage. Thus, the methods of calibrating and operating the ion trap should also take into account such deviations from linearity of applied voltages, especially as they relate to different scanning rates.

SUMMARY OF THE INVENTION

Disclosed herein are methods of calibrating the main and supplementary RF voltages of ion trap mass spectrometers to maintain mass accuracy and a high degree of peak quality at a variety of scanning rates, including fast scanning rates. It is found that the variation, with mass, of the main and supplementary RF voltages is not completely linear, as is conventionally predicted by the Mathieu equation and a driven harmonic oscillator model, respectively. In particular, significant deviations are observed at faster scan rates. The methods and apparatus taught herein include taking into account the effects of the initial average positions, within the trap, of ions of different mass-to-charge ratios in order to calibrate mass axes while simultaneously providing well-formed peaks at a variety of mass scanning rates.

Accordingly, in a first aspect of the invention, there is provided a method of calibrating an ion trap mass analyzer having a plurality of electrodes to which a main RF trapping voltage and a resonant ejection voltage are applied during operation of the ion trap mass analyzer, the method comprising steps of: (a) selecting an analytical scan rate at which to operate the mass spectrometer; (b) identifying, for each of a plurality of ion types produced from at least one calibrant material and having respective mass-to-charge ratios, an optimum resonant ejection voltage amplitude at which a mass peak quality value is optimized when the ion trap mass analyzer is operated at the selected scan rate, the mass peak quality value representative of one or more mass peak characteristics observed during operation of the ion trap mass analyzer; (c) determining a best-fit function from the identified optimum resonant ejection voltage amplitudes and the mass-to-charge ratios, the best-fit function of the form $V_{reseject}=m^c(a+bm)$, where $V_{reseject}$ is a variable representing resonant ejection voltage amplitude, m is a variable representing mass-to-charge ratio, and a and b and c are constants determined by a fitting procedure, where $c\approx 0.5$, for instance, $0.40\leqq c\leqq 0.60$; and (d) storing information representing the best-fit function derived in step (c). Various embodiments may further comprise the steps of: (e) identifying, for each of a plurality of ion types having respective mass-to-charge ratios, a respective trapping voltage amplitude at which ions of each said ion type are ejected from the ion trap mass analyzer when the ion trap mass analyzer is operated at the selected scan rate and employing a resonant ejection voltage calculated according to the information stored in step (d); (f) determining a second best-fit function from the identified trapping voltage amplitudes and the mass-to-charge ratios of the plurality of ion types employed in step (e), the second best-fit function being of a form that yields an RF trapping voltage amplitude that is required to eject an ion having mass-to-charge ratio, m, from the ion trap mass analyzer; and (g) storing information representing the second best-fit function derived in step (f).

In a second aspect of the invention, there is provided an ion trap mass spectrometer, comprising: (i) a plurality of electrodes defining an interior volume for receiving and trapping ions; (ii) a main RF trapping voltage source for applying an RF trapping voltage to at least a portion of the plurality of electrodes; (iii) a resonant ejection voltage source for applying a resonant ejection voltage to at least a portion of the plurality of electrodes; and (iv) a controller, coupled to the RF trapping voltage and the resonant ejection voltage source, configured to perform steps of: (a) setting an analytical scan rate at which to operate the mass spectrometer; (b) identifying, for each of a plurality of ion types produced from at least one calibrant material and having respective mass-to-charge ratios, an optimum resonant ejection voltage amplitude at which a mass peak quality value is optimized when the ion trap mass analyzer is operated at the selected scan rate, the mass peak quality value representative of one or more mass peak characteristics observed during operation of the ion trap mass analyzer; (c) determining a best-fit function from the identified optimum resonant ejection voltage amplitudes and the mass-to-charge ratios, the best-fit function of the form $V_{reseject}=m^c(a+bm)$, where $V_{reseject}$ is a variable representing resonant ejection voltage amplitude, m is a variable representing mass-to-charge ratio and a, b and c are constants determined by a fitting procedure, where $c\approx 0.5$, for instance, $0.40\leqq c\leqq 0.60$; and (d) storing information representing the best-fit function derived in step (c). The controller may be further configured to perform the further steps of: (e) identifying, for each of a plurality of ion types produced from at least one calibrant material and having respective mass-to-charge ratios, a respective RF voltage amplitude at which ions of each said ion type are ejected from the ion trap mass analyzer when the ion trap mass analyzer is operated at the selected scan rate and employing a resonant ejection voltage calculated according to the information stored in step (d); (f) determining a second best-fit function from the identified RF voltage amplitudes and the mass-to-charge ratios of the plurality of ion types employed in step (e), the second best-fit function being of a form that yields an RF voltage amplitude that is required to eject an ion having mass-to-charge ratio, m, from the ion trap mass analyzer; and (g) storing information representing the second best-fit function derived in step (f).

In yet another aspect of the invention, there is provided a method of calibrating and operating an ion trap mass spectrometer having a plurality of electrodes to which a main RF trapping voltage and a resonant ejection voltage are applied during operation of the ion trap mass analyzer, the method comprising the steps of: (a) identifying, for each of a plurality of ion types produced from at least one calibrant material and having respective mass-to-charge ratios, a respective trapping voltage amplitude at which ions of each ion type of the plurality of ion types are ejected from the ion trap mass analyzer when the ion trap mass analyzer is operated at a selected scan rate and employing a pre-determined resonant ejection voltage profile; (b) determining a best-fit function from the identified trapping voltage amplitudes and the mass-to-charge ratios of the plurality of ion types, the best-fit function having a form chosen from the group consisting of $$V_{RF}(m) = am + b + \frac{p}{(1+qm)^r},\quad V_{RF}(m) = am + b + \frac{p}{1+(m/q)^r}$$

and $V_{RF}(m)=am+b+p\exp(rm)$ where a, b, p, q and r are constants determined by a fitting procedure, and $V_{RF}(m)$ is an applied RF trapping voltage amplitude that is required to eject an ion having mass-to-charge ratio, m, from the ion trap mass analyzer when the ion trap mass analyzer is operated at the selected scan rate and employing the pre-determined resonant ejection voltage profile; and operating the ion trap mass analyzer at the selected scan rate to analyze a sample employing the best-fit function determined in step (b) to relate applied trapping voltage to mass-to-charge ratio of detected sample ions. A mass scan of the ion trap analyzer to analyze a sample may be performed using a trapping voltage amplitude that varies non-linearly in time such that the mass-to-charge ratio of detected ions varies linearly in time in accordance with the best-fit function determined in step (b). Alternatively, the operation of the ion trap mass spectrometer may comprise performing a mass scan of the ion trap mass analyzer to analyze a sample using a trapping voltage amplitude that varies linearly in time; and calculating mass-to-charge ratios of sample ions detected during the mass scan using the best-fit function determined in step (b).

Methods or steps in accordance with the invention may be automatically initiated either at prescribed intervals or on the occurrence of prescribed events. A second analytical scan rate may be selected after which either steps (b)-(d) or (b)-(g) are repeated using the second selected analytical scan rate. In various embodiments, the step (b) may comprise: (b1) acquiring a plurality of mass spectra of a selected calibrant material such that the ion trap mass analyzer is operated at the selected scan rate, wherein each of the mass spectra corresponds to operation of the ion trap mass analyzer at a different respective Vreseject value; and (b2) calculating, for each of the plurality of acquired mass spectra, a mass peak-quality value derived from one or more peak characteristics chosen from the group consisting of peak height, peak width, inter-peak valley depth, peak symmetry, spacing of related peaks representing an isotopic distribution and peak position. In some embodiments, a portion of the ions used for calibration may comprise precursor ions, while another portion of the ions may be fragment ions produced by fragmentation of the precursor ions.

In various embodiments, the step (f) of determining the second best-fit function may be performed such that said function does not have a constant first derivative over a full scanning range of the ion trap mass analyzer. In some embodiments, the second best-fit function may be of a form such as $$V_{RF}(m) = am + b + \frac{p}{(1+qm)^r}$$

or, alternatively, $$V_{RF}(m) = am + b + \frac{p}{1+(m/q)^r},$$

or, alternatively, $V_{RF}(m)=am+b+p\exp(rm)$, where a, b, p, q and r are constants determined by a second fitting procedure, and $V_{RF}(m)$ is an applied RF trapping voltage amplitude that is required to eject an ion having mass-to-charge ratio, m, when an ion trap is operated at the selected scan rate. In various other embodiments, the second best-fit function may comprise a piecewise linear function. In various embodiments, the step (f) may comprise: (f1) acquiring a plurality of mass spectra of a first set of ions of selected ion types by scanning the trapping voltage amplitude while operating the ion trap mass analyzer at the selected scan rate and employing resonant ejection voltages calculated according to the information stored in step (d); (f2) determining an approximate fit function using results obtained in step (f1), the approximate fit function being of a form that yields an approximate applied RF trapping voltage amplitude that is required to eject an ion having mass-to-charge ratio, m, from the ion trap mass analyzer; (f3) acquiring a plurality of mass spectra of a second set of ions of the selected ion types by scanning the trapping voltage amplitude while operating the ion trap mass analyzer at the selected scan rate, employing resonant ejection voltages calculated according to the information stored in step (d) and employing the approximate fit function calculated in step (f2); and (f4) calculating the second best-fit function using results obtained in step (f3).

In still yet another aspect of the invention, there is provided a method of calibrating the mass-axis scale of an ion trap mass spectrometer comprising the steps of: (a) identifying, for each of a plurality of ion types produced from at least one calibrant material and having respective mass-to-charge ratios, a trapping voltage amplitude at which ions of each respective ion type are ejected, by resonance ejection, from the ion trap mass analyzer when the ion trap mass analyzer is operated at a selected scan rate; (b) determining a best-fit function from the identified trapping voltage amplitudes and the mass-to-charge ratios of the plurality of ions, the best-fit function yielding an RF trapping voltage amplitude, $V_{RF}(m)$, that is required to eject an ion having mass-to-charge ratio, m, from the ion trap mass spectrometer operated at the selected scan rate; wherein said best-fit function does not have a constant first derivative over a full scanning range of the ion trap mass spectrometer; and (c) storing information representing the best-fit function derived in step (b).

BRIEF DESCRIPTION OF THE DRAWINGS

The above noted and various other aspects of the present invention will become apparent from the following description which is given by way of example only and with reference to the accompanying drawings, not necessarily drawn to scale, in which.

DETAILED DESCRIPTION

Figure 1:
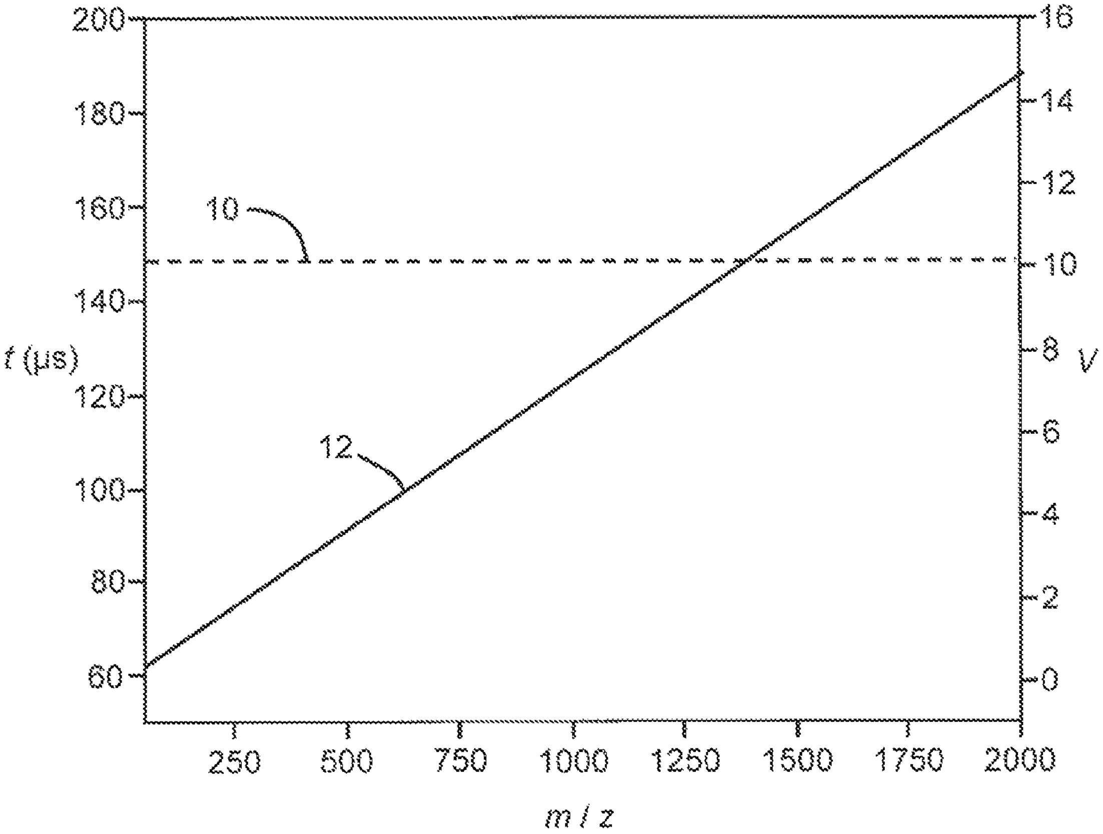
FIG. 1 is a graph of calculated resonant ejection voltage required to eject ions in a constant time of approximately 148 μs vs. m/z, using Eq. 2.

The present invention provides improved methods for calibrating ion trap mass spectrometers. The following description is presented to enable any person skilled in the art to make and use the invention, and is provided in the context of a particular application and its requirements. Various modifications to the described embodiments will be readily apparent to those skilled in the art and the generic principles herein may be applied to other embodiments. Thus, the present invention is not intended to be limited to the embodiments and examples shown but is to be accorded the widest possible scope in accordance with the features and principles shown and described. It is to be noted that, throughout this entire disclosure, the terms mass and mass-to-charge will be used interchangeably, as is common practice. Accordingly, the mathematical symbol for mass, m, is used interchangeably with the symbolism for mass-to-charge ratio, m/z. It should also be noted that the term voltage and the corresponding symbol, V, with or without an identifying subscript, refers to a voltage amplitude such as a peak voltage or root-mean-square voltage of an oscillatory RF or AC electric field. The particular features and advantages of the invention will become more apparent with reference to the appended FIGS. 1-15, taken in conjunction with the following description.

In practice, the mass scale of resonantly ejected ions is only approximately linear with respect to $V_{RF}$ when an ion trap is operated as described above. The deviations from linearity are especially pronounced at high rates of scanning $V_{RF}$. As a heuristic approach to understanding this behavior, consider, as a rough approximation, that an ion in the quadrupole ion trap is a one-dimensional driven harmonic oscillator, a particle whose equation of motion is given by Eq. 1, where x is the position coordinate, ω is the oscillation frequency of the particle, m is mass, and F(t) is a periodic excitation force, F(t)=f cos(γt+β).

$$\frac{\partial^2 x}{\partial t^2} + \omega^2 x = \frac{F(t)}{m} \qquad \text{Eq. 1}$$

Resonance ejection may be achieved under the condition that ω=γ. As described by Landau (Mechanics 3rd Ed., 1976), the solution to Eq. 1 for this resonance condition is given by Eq. 2:

$$x = a\cdot\cos(\omega t+\alpha) + \frac{f}{2m\omega}\cdot t\cdot\sin(\omega t+\beta) \qquad \text{Eq. 2}$$

where a, α and β are constants.

Eq. 2 is useful for demonstrating several aspects of the resonance ejection process, and in particular to estimate the relative voltage required for particles of various masses to reach a given amplitude (i.e., to be ejected) in a constant amount of time. The force f in Eq. 2 corresponds to the resonant ejection voltage, $V_{reseject}$. According to Eq. 2, the displacement, x, of an ion from a central position may be approximated as sum of two oscillatory terms, the second of which depends on the magnitude of the resonant ejection voltage. The factor ft/2 mω in the second term has units of length and thus may be considered as the varying amplitude (i.e., a distance) of an oscillatory component of motion of the particle. In particular, Eq. 2 shows that, at resonance, the amplitude of the ion motion grows linearly with respect to time.

Figure 2:
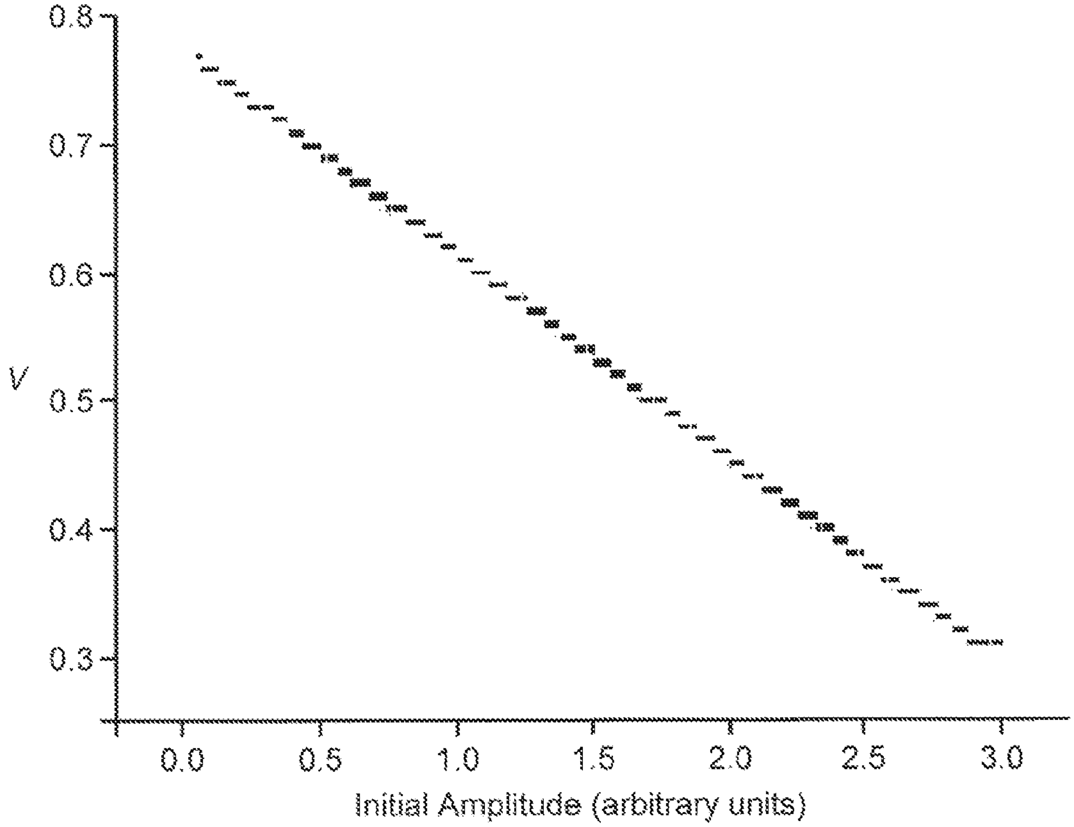
FIG. 2 is a graph of calculated resonant ejection voltage required to reach a constant amplitude in constant time vs. starting amplitude, using Eq. 2.

In order to achieve a close approach to mass-axis linearity as well as optimal peak characteristics, ions of different masses should be ejected at a constant time after attainment of the resonance condition for each respective mass. For this time constancy to occur, the quantity f, which is related to the voltage amplitude of the supplementary resonant ejection field, should increase linearly with mass, as illustrated in FIG. 1. This figure shows a plot of the calculated voltage required to eject different ions (plot 12) at a constant time of approximately 148 μs (graph 10) plotted vs. m/z, assuming the same initial starting positional amplitude for each mass. U.S. Pat. No. 5,572,025 ("Method and Apparatus for Scanning an Ion Trap Mass Spectrometer in the Resonance Ejection Mode") in the names of inventors Cotter et al. describes a method of varying the resonant ejection amplitude proportionally to the main trapping voltage, which relies on the behavior of FIG. 1. Although Cotter et al. teach mass-axis calibration, it has been found that, at high scan rates, there are significant deviations from the Cotter proportional relationship and even from a fully linear relationship. Furthermore, the prior art methods fail to account for the behavior, as calculated using Eq. 2 and as illustrated in FIG. 2, that ions with greater initial positional amplitude require less voltage to be ejected in the same amount of time as ions with lesser initial amplitudes.

Figure 3:
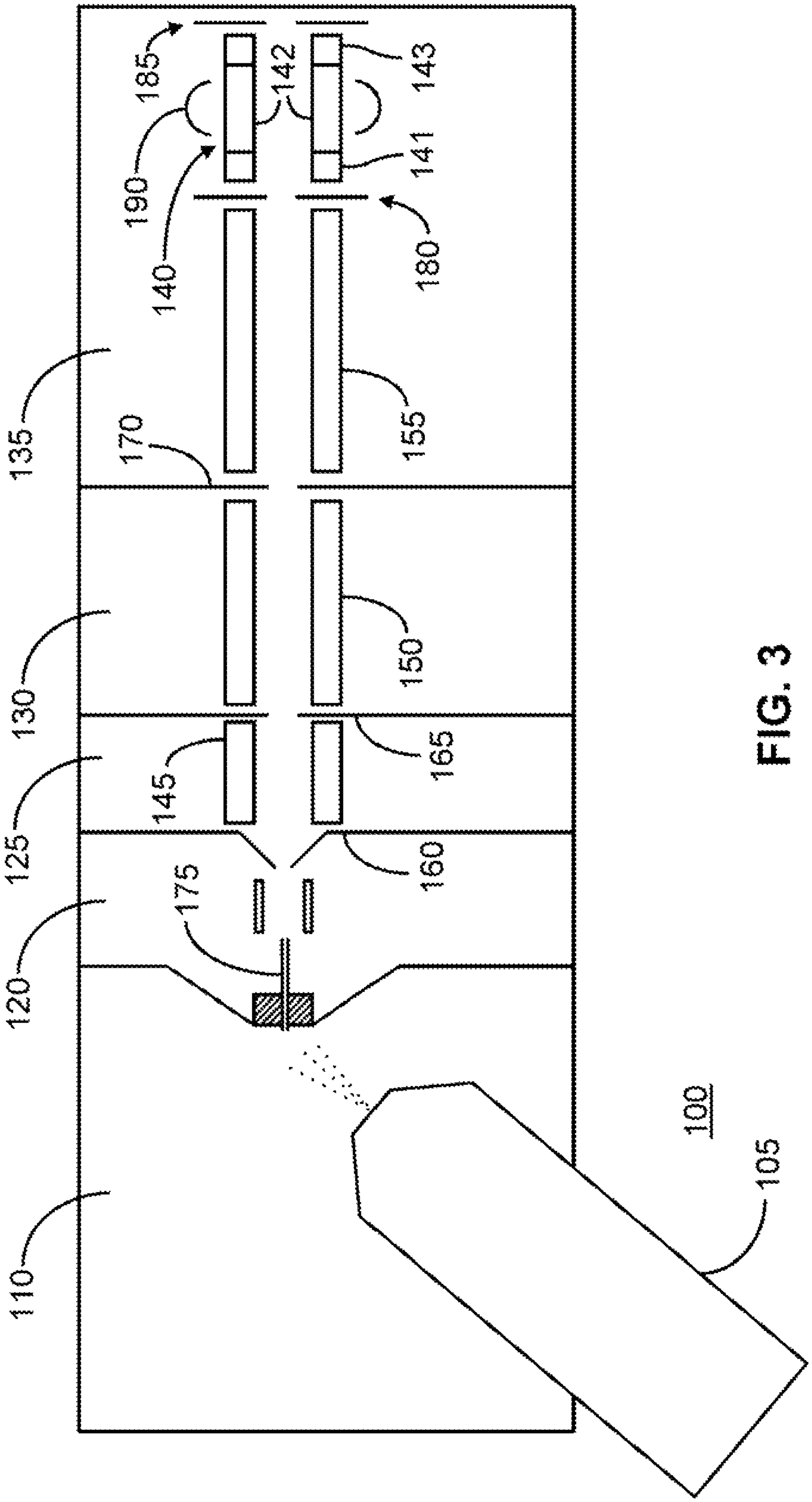
FIG. 3 is symbolic view of an ion trap mass spectrometer which may be calibrated and operated in accordance with methods embodying the present invention.

FIG. 3 illustrates an example of an ion trap mass spectrometer 100 which may be calibrated and operated in accordance with embodiments of the present invention. It will be understood that certain features and configurations of mass spectrometer 100 are presented by way of illustrative examples, and should not be construed as limiting the methods of the present invention to implementation in a specific environment. An ion source, which may take the form of an electrospray ion source 105, generates ions from a sample material. For the calibration methods described herein, the sample material may be either a single calibration compound or a mixture of one or more calibration compounds that yield calibrant ions of one or more known m/z values. Preferably, the calibration compound or mixture is selected to produce a set of calibrant ions having m/z's that span a substantial portion of the measurable range. For example, a standard calibration mix may yield ions having m/z's of 195 (caffeine), 524 (MRFA), 1222, 1522 and 1822 (Ultramark). The calibration mix may be introduced via infusion from a syringe, a chromatography column, or injection loop.

The ions are transported from ion source chamber 110, which for an electrospray source will typically be held at or near atmospheric pressure, through several intermediate chambers 120, 125 and 130 of successively lower pressure, to a vacuum chamber 135 in which ion trap 140 resides. Efficient transport of ions from ion source 105 to ion trap 140 is facilitated by a number of ion optic components, including quadrupole RF ion guides 145 and 150, octopole RF ion guide 155, skimmer 160, and electrostatic lenses 165 and 170. Ions may be transported between ion source chamber 110 and first intermediate chamber 120 through an ion transfer tube 175 that is heated to evaporate residual solvent and break up solvent-analyte clusters. Intermediate chambers 120, 125 and 130 and vacuum chamber 135 are evacuated by a suitable arrangement of pumps to maintain the pressures therein at the desired values. In one example, intermediate chamber 120 communicates with a port of a mechanical pump (not depicted), and intermediate pressure chambers 125 and 130 and vacuum chamber 135 communicate with corresponding ports of a multistage, multiport turbo-molecular pump (also not depicted). Ion trap 140 includes a set of rod electrodes 142 which generate an approximate two-dimensional quadrupolar field for radial confinement of ions. The ion trap 140 further includes end sections 141 and 143 having respective axial trapping electrodes in order to generate of a potential well for axial confinement of ions. Controlled gating of ions into the interior volume of ion trap 140 is effected by lens 170. A damping/collision gas inlet (not depicted), coupled to a source of an inert gas such as helium or argon, will typically be provided to controllably add a damping/collision gas to the interior of ion trap 140 in order to facilitate ion trapping, fragmentation and cooling. Lenses 180 and 185 are plate lenses which function to focus the ions into (and possibly out) of the trap and to limit the conductance of the trap so as to maintain an appropriate helium (or other gas) pressure within the trap. Ion trap 140 is additionally provided with at least one set of detectors 190 that generate a signal representative of the abundance of ions ejected from the ion trap.

Ion trap 140, as well as other components of mass spectrometer 100, communicate with and operate under the control of a data and control system (not depicted), which will typically include a combination of one or more general purpose computers and application-specific circuitry and processors. Generally described, the data and control system acquires and processes data and directs the functioning of the various components of mass spectrometer 100. The data and control system will have the capability of executing a set of instructions, typically encoded as software or firmware, for carrying out the calibration methods described herein.

Figure 4:
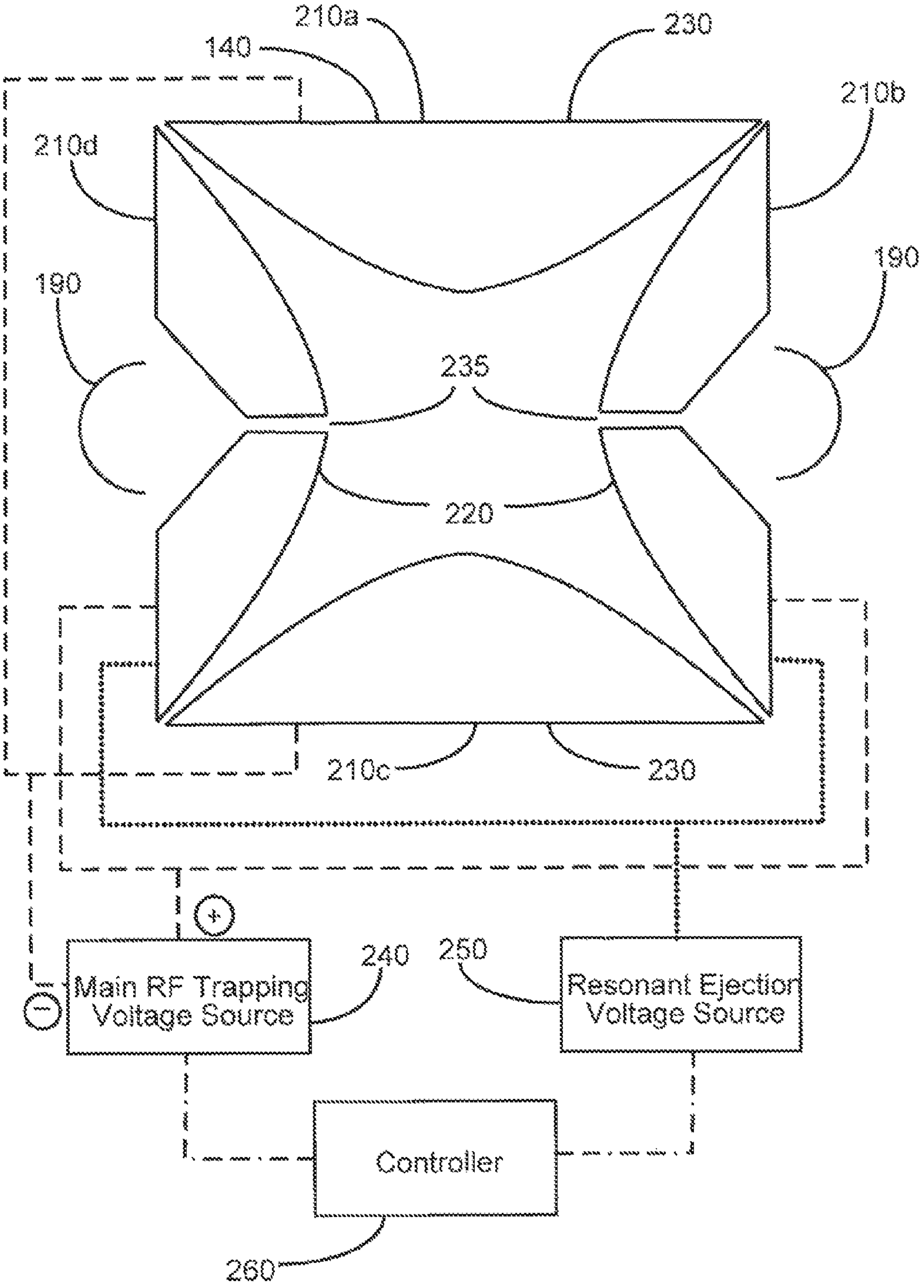
FIG. 4 is a symbolic lateral cross-sectional view of a two-dimensional radial ejection ion trap mass analyzer.

FIG. 4 depicts a symbolic cross-sectional view of ion trap 140, which may be constructed as a conventional two-dimensional ion trap of the type described by Schwartz et al. in "A Two-Dimensional Quadrupole Ion Trap Mass Spectrometer", J. Am. Soc. Mass Spectrometry, 13: 659-669 (2002). Ion trap 140 includes four elongated electrodes 210*a*, 210*b*, 210*c*, 210*d*, each electrode having an inwardly directed hyperbolic-shaped surface, arranged in two electrode pairs 220 and 230 aligned with and opposed across the trap centerline. The electrodes of one electrode pair 220 are each adapted with an aperture (slot) 235 extending through the thickness of the electrode in order to permit ejected ions to travel through the aperture to an adjacently located detector 190. A main RF trapping voltage source 240 applies opposite phases of an RF voltage to electrode pairs 220 and 230 to establish an RF trapping field that radially confines ions within the interior of ion trap 140. During analytical scans, resonant ejection voltage source 250 applies an oscillatory voltage across apertured electrode pair 220 to create a dipole excitation field. The amplitude of the applied main RF voltage is ramped such that ions come into resonance with the excitation field in order of their m/z's. The resonantly excited ions develop unstable trajectories and are ejected through apertures 235 to detectors 190. Control of the main RF voltage and resonant ejection voltage applied to electrodes of ion trap 140, specifically adjustment of their amplitudes, frequency, and relative phase, is effected by a controller 260 that forms part of the data and control system. Controller 260 may be operable to adjust the analytical scan rate as well as the variation of trapping and resonant ejection voltages in accordance with the methods of the present teachings, either automatically or in accordance with operator input.

While FIG. 4 depicts a conventionally arranged and configured two-dimensional ion trap, practice of the invention should not be construed as being limited thereto. In an alternative implementation, the ion trap may take the form of a symmetrically stretched, four-slotted ion trap of the type described in U.S. patent application Pub. No. 2010-0059670 in the name of inventor Jae C. Schwartz, titled "Two-Dimensional Radial-Ejection Ion Trap Operable as a Quadrupole Mass Filter", filed on Sep. 5, 2008, and assigned to the assignee of the instant invention, the disclosure of which is herein incorporated by reference. The ion trap may also constitute a part of a dual ion trap mass analyzer structure disclosed in U.S. Patent Application Pub. No. 2008-0142705A1 for "Differential-Pressure Dual Ion Trap Mass Analyzer and Methods of Use Thereof" in the names of inventors Jae C. Schwartz et al, which is also assigned to the assignee of the instant invention and incorporated herein by reference. More generally, the theoretical analyses and calibration methods taught herein may be applied generally to any ion trap apparatus that employs quadrupolar or substantially quadrupolar trapping fields and is operated in mass-instability resonance ejection mode. Consequently, these methods may be used in conjunction with 2-dimensional linear ion traps, segmented linear ion traps, modified 2-dimensional linear traps such as so-called C-traps comprising curved rod electrodes, 3-dimensional, rotationally symmetric ion traps, such as conventional Paul trap apparatuses comprising a ring electrode and two end-cap electrodes, etc.

Optimized Resonance Ejection Amplitude Vs. Mass

As discussed above, it is desirable to achieve ejection voltages that linearize the mass scale while simultaneously optimizing peak characteristics. The desired condition is met when ions of different mass are excited and ejected from the trap in the same amount of time. As illustrated by Equation 2, the time required for ejection depends on the initial amplitude of ion motion, and ions of different mass have different initial amplitudes of motion. Thus, we may find a correction to the linear scan in the form of a relation describing the ion initial amplitude of motion as a function of mass, or the ion initial positions as a function of mass, which are proportional to amplitude.

The following discussion demonstrates that the required voltages for achieving linearity ejection times and for achieving optimized peak characteristics are approximately the same. As a starting point, we note that Li et al. ("Comparison of Equilibrium Ion Density Distribution and Trapping Force in Penning, Paul, and Combined Ion Traps" Jour. Amer. Soc. Mass Spectrometry, 1998, 9(5), pp. 473-481) derived analytical expressions for the number density of ions in a Paul trap as a function of position, x. Eq. 3 gives Eq. 16c from their paper, $$n(x) = \frac{N\sqrt{k_x}}{\pi k_b T}\exp\left(\frac{k_x x^2}{k_b T}\right) \qquad \text{Eq. 3}$$

where N is number of ions, $k_b$ is Boltzmann's constant, T is absolute temperature, and $k_x$ is the trapping force constant for ions trapped in a pseudo-potential harmonic oscillator well, given by Eq. 4 as $$k_x = \frac{q^2\Omega^2 m}{16} \qquad \text{Eq. 4}$$

in which Ω is the main RF frequency. Eq. 4 is obtained from Eq. 3c in Li et al., after rearranging to give an expression at a constant Mathieu q value for each mass.

It should be noted that Eq. 4 does not depend on the ion charge. Numerical simulations (not shown) performed by the inventors have demonstrated that ions of the same mass-to-charge but different charge may have different average positions, but only because of the effect of collisions with the buffer gas. Calculated differences in ejection time for these ions were less than 0.01 Da at 33 kDa/s, and were shown to depend on pressure. Although this result has yet to be confirmed experimentally, we assume that charge state may be ignored in our calibrations. We also note that, although Eq. 4 is not strictly applicable for Mathieu q values greater than 0.40, the data presented below nonetheless suggest that the results are adequately approximated using the pseudo-potential well approximation implied by Eq. 4. The pseudo-potential well model has previously been applied in the range of q>0.40 with some degree of success (e.g., Makarov, Anal. Chem. 1996, 68, 4257-4263).

Eq. 3 above can be integrated to give the average x position of the ions, with the result that average position is proportional to the inverse square root of mass, as in Eq. 5.

$$\langle x\rangle = \int_0^\infty n(x)\cdot x\,dx \propto \frac{1}{\sqrt{m}} \qquad \text{Eq. 5}$$

Figure 5:
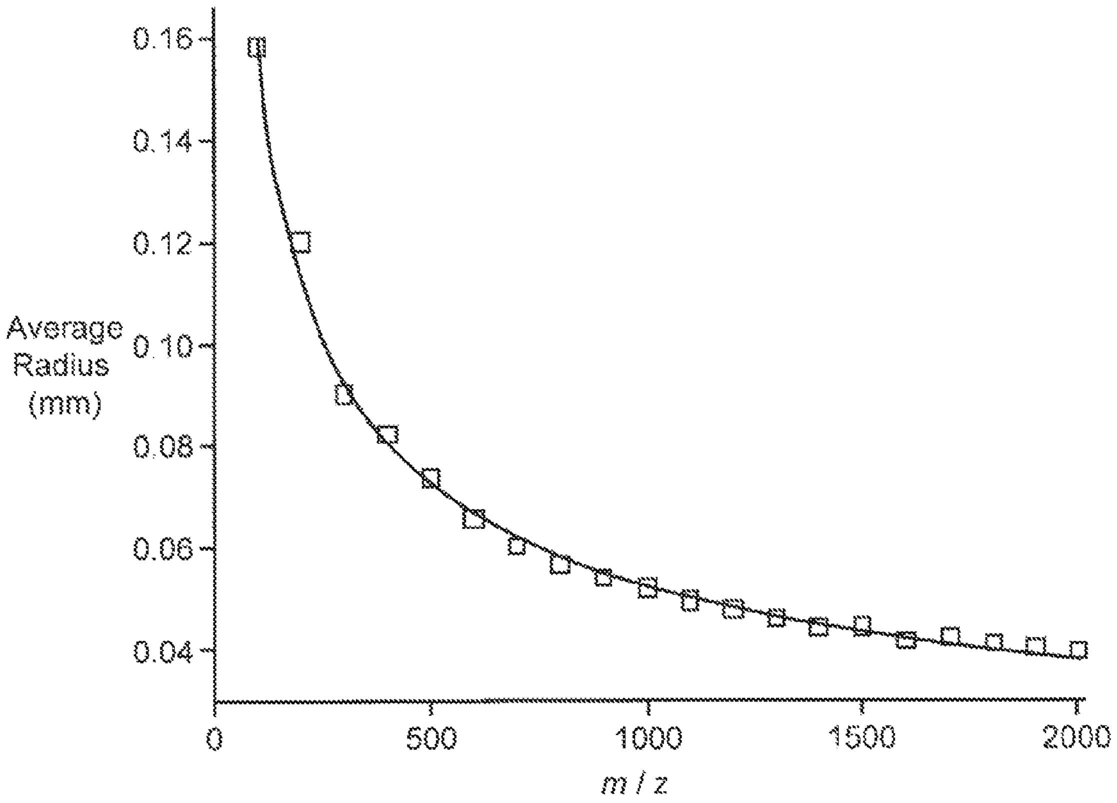
FIG. 5 is a graph (hollow rectangles) of the simulated average positional radius for 10240 ions after trapping in a linear ion trap at q=0.76 for 60 ms, at 0.35 mTorr He, shown together with a curve illustrating a least-squares fit to $y=ax^b$, where $b\approx-0.5$.
Figure 6:
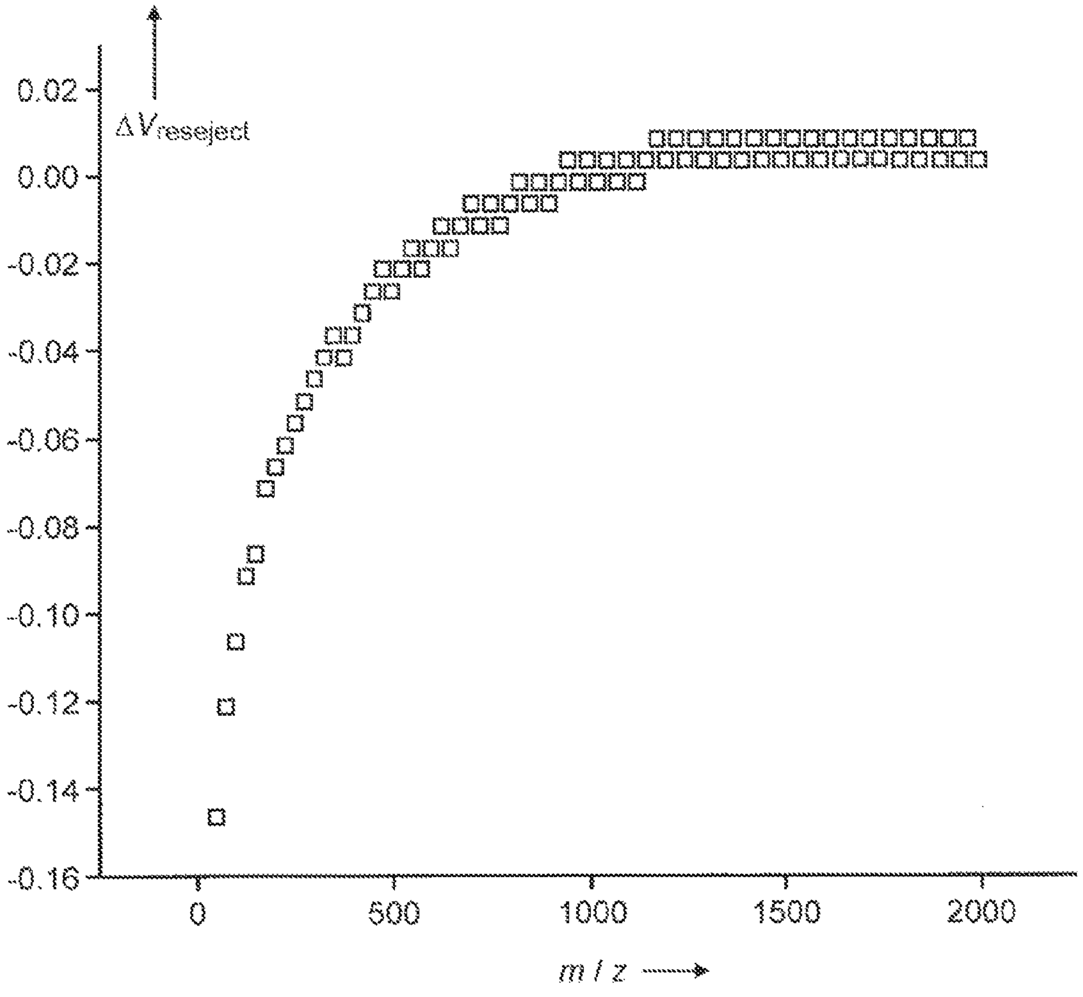
FIG. 6 is a graph of the calculated resonant ejection voltage required to eject in constant time vs. m/z, using Eq. 2, in which a linear fit to the points, determined from m/z values greater than 1000, has been subtracted from all the points.

The relationship given by Eq. 5 has been confirmed with numerical simulations of ions trapped in a linear ion trap mass spectrometer. In the calculations, a total of 10240 ions at each mass were modeled as in equilibrium with helium gas at 0.35 mTorr for 60 ms at a Mathieu q value of 0.76. The average position of the ions under these conditions was recorded. The average distance of various ions from the trap center, as determined in the above fashion, is plotted in FIG. 5 vs. m/z. When the results plotted in FIG. 5 plot are then used to set initial ion positional amplitudes in Eq. 2, the resonance ejection amplitude required for ejection of various masses in a constant time now deviates from linear especially at low mass, as seen in FIG. 6. Note that a linear fit, determined from fitting to m/z values greater than 1000, has been subtracted from all of the results depicted in FIG. 6. Thus, FIG. 6 depicts the resonance ejection voltage deviation, $\Delta V_{reseject}$ from a purely linear relationship.

The general form of the results depicted in FIG. 6 is interesting because it matches very closely the shape of the voltage required to eject ions with best peak characteristics (see below). This matching of voltage profiles has led the inventors to the realization that the resonant ejection voltage that gives best peak characteristics is also quite dependent on the initial conditions of the ions. Thus, the inventors of the instant invention have hypothesized that an optimal function for describing the required resonant ejection voltage vs. mass can be constructed as the product of the linear relationship of voltage with mass in FIG. 1 with a second function having an approximate square-root dependence, to compensate for the inverse square root in Eq. 5. This result is shown in Eq. 6, in which $a_r$, $b_r$ and c are constants which may be determined by a fitting procedure, with c≈0.5. The final result is given in Eq. 6, $$V_{reseject}=m^c(a_r+b_r m) \qquad \text{Eq. 6}$$

Figure 7A:
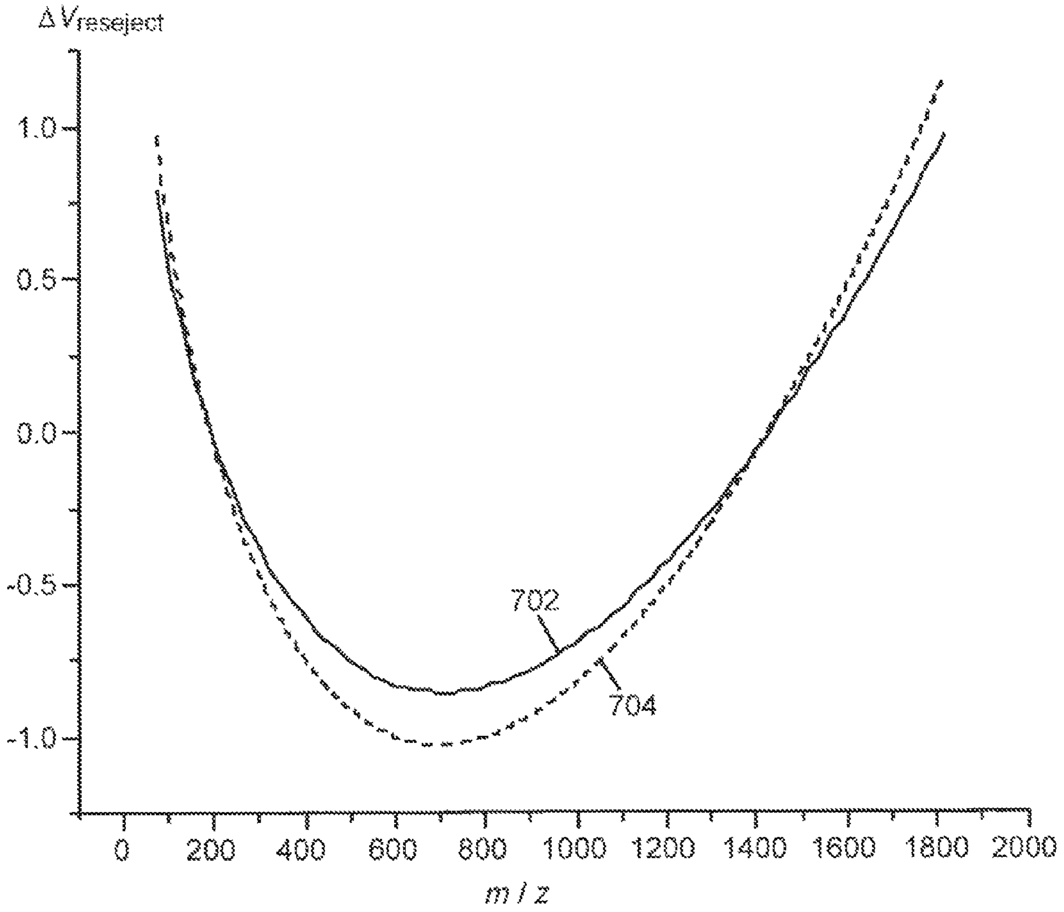
FIG. 7A is a plot of a first graph (solid line) of the difference between two different models for optimal resonant ejection voltage relating as fit to experimental data obtained at a scan rate of 33 kDa/s and a second graph (dashed line) of the difference between the two models as fit to experimental data obtained at a scan rate of 66 kDa/s.
Figure 7B:
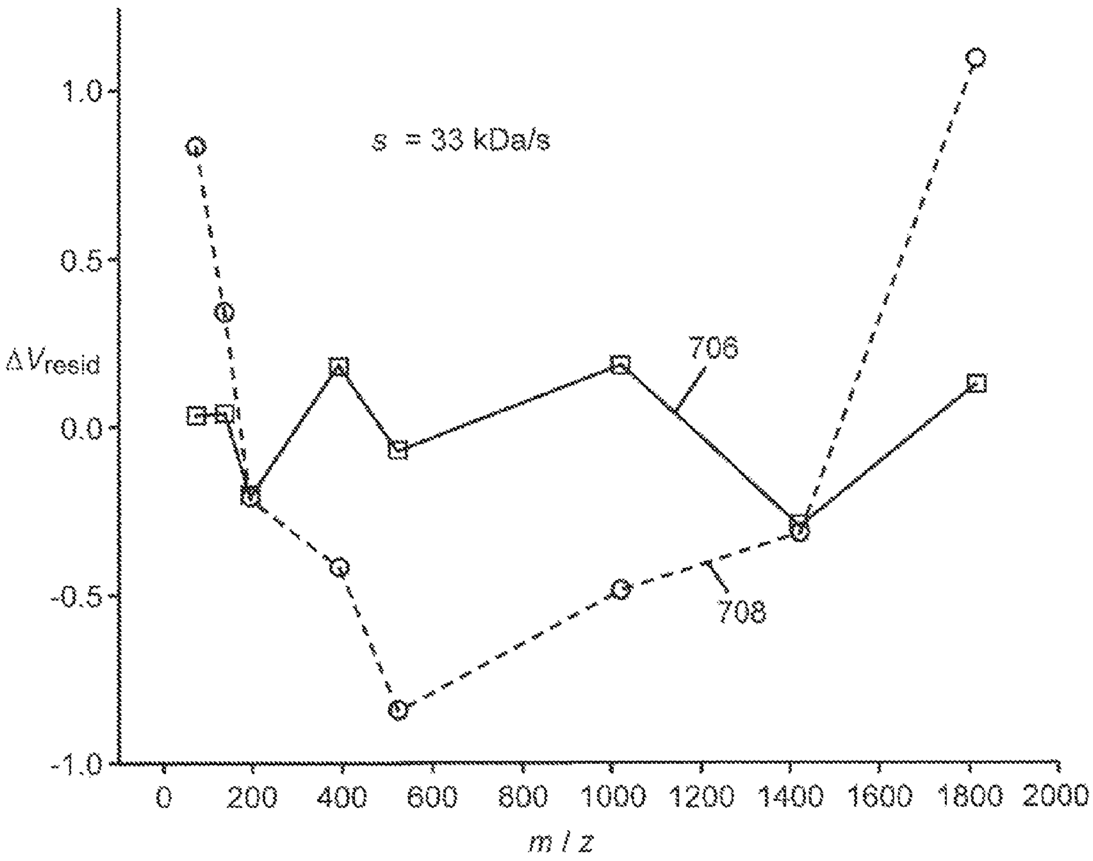
FIG. 7B is a plot of the residual error between experimental data obtained at a scan rate of 33 kDa/s and two best fit curves to the data employing two different respective model equations.
Figure 7C:
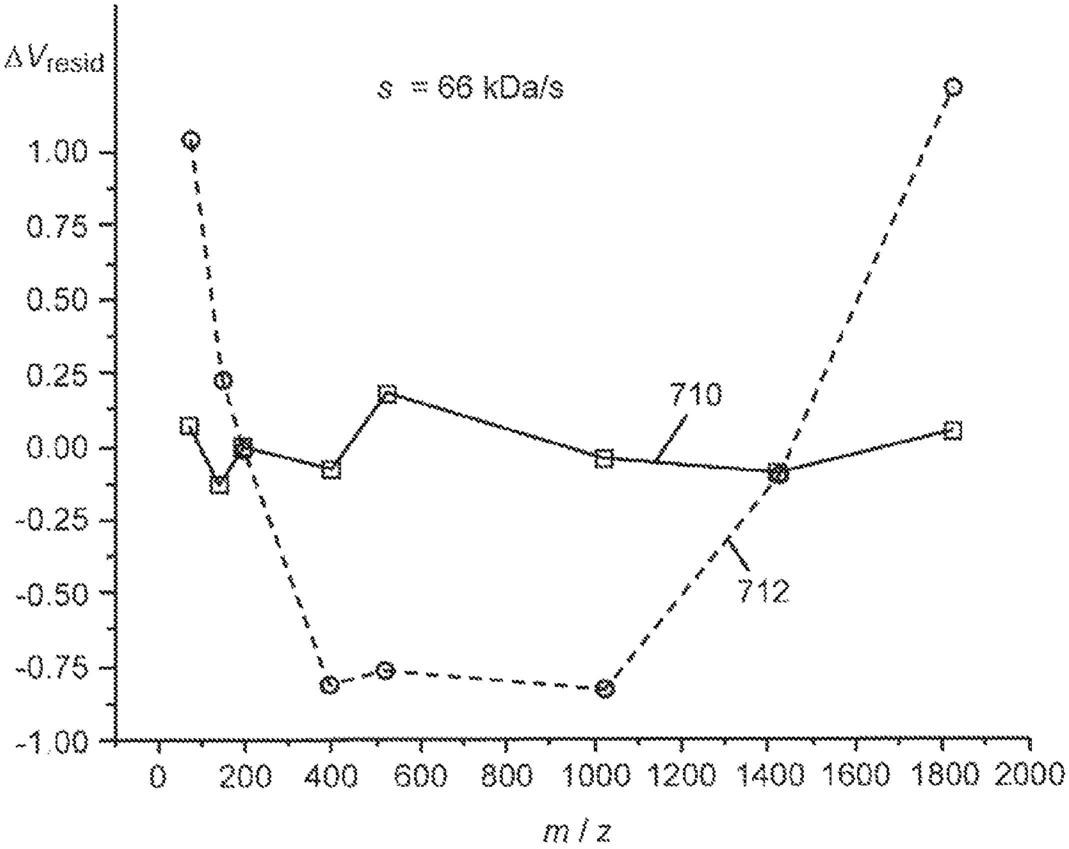
FIG. 7C is a plot of the residual error between experimental data obtained at a scan rate of 66 kDa/s and two best fit curves to the data employing two different respective model equations.

The calibration of resonant ejection voltage vs. mass can be performed via a non-linear least-squares fit of experimental data to Eq. 6. For comparison purposes, the same experimental data may be fit to the square root of mass relationship prescribed by Franzen in U.S. Pat. No. 5,298,746, that prior relationship having the form $V_{reseject}=a_r+b_r m^{0.5}$. FIG. 7A shows the difference between the optimal $V_{reseject}$ calculated from a best-fit curve having the form of Eq. 6 and the optimal $V_{reseject}$ calculated from a the best-fit curve having the form prescribed by Franzen for a linear ion trap scanning at a rate, s, of 33 kDa/s (solid curve 702) and a rate, s, of 33 kDa/s (dashed curve 704). The solid line curve is calculated with parameter, c, of Eq. 6 constrained at a value of 0.5. FIG. 7A illustrates that calculations according to the two different best-fit models yield optimal resonant ejection voltages that differ from one another systematically, according to m/z. To determine which model provides a better fit to the data, the residuals from the fitting procedures are plotted in FIGS. 7B and 7C as discrete points connected by lines. FIG. 7B relates to experimental data obtained at a scan rate of 33 kDa/s and FIG. 7C relates to experimental data obtained at a scan rate of 66 kDa/s. Plots 706 and 710 show residuals relating to fits assuming the functional form of Eq. 6; plots 708 and 712 show residuals relating to fits assuming the functional form prescribed by Franzen. It is concluded that Eq. 6 matches the data better than does the square-root dependence set forth by Franzen.

Figure 8A:
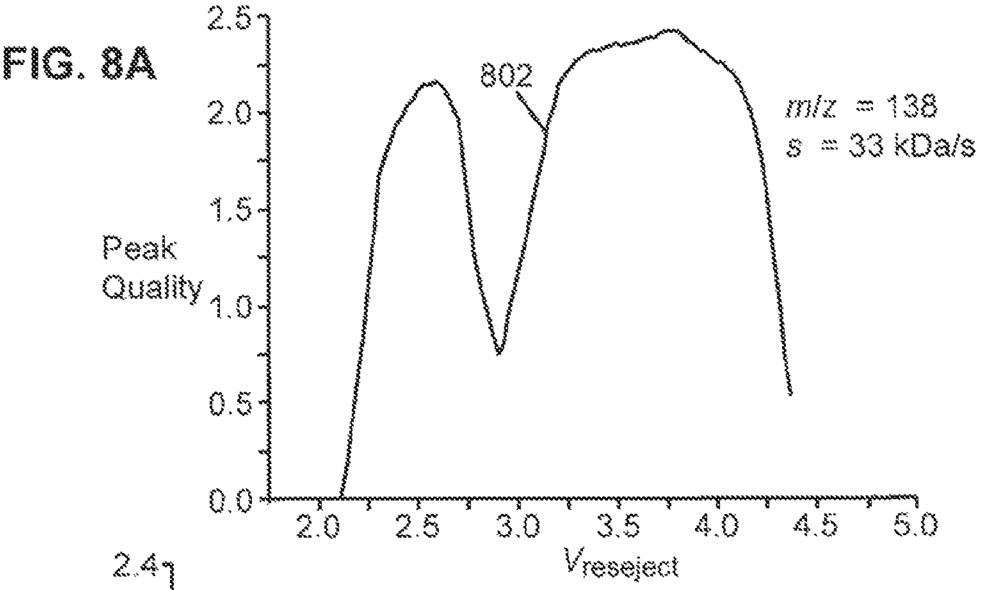
FIG. 8A is a graph of a peak quality parameter plotted vs. resonant ejection voltage as determined from experimental measurements of an ion type having an m/z value of 138 Da, measured at a scan rate, s, of 33 kDa/s.
Figure 8B:
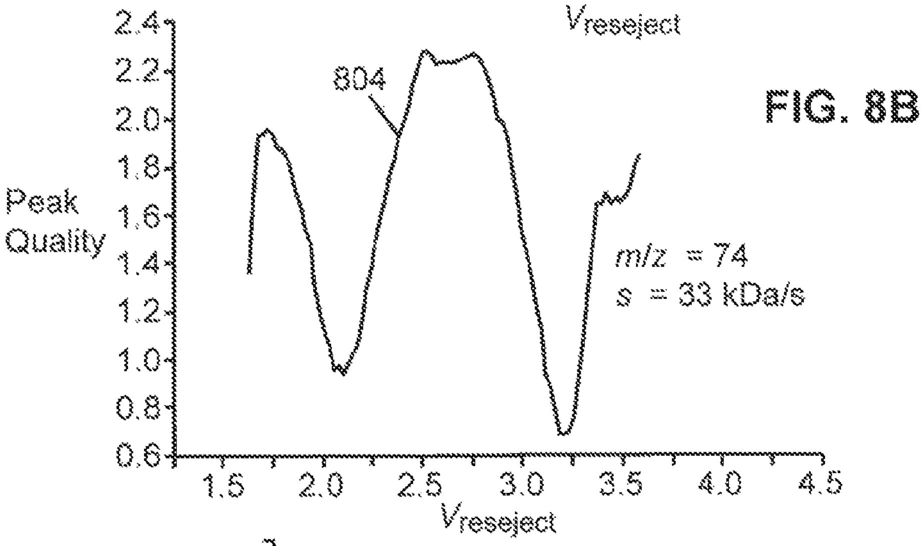
FIG. 8B is a graph of a peak quality parameter plotted vs. resonant ejection voltage as determined from experimental measurements of an ion type having an m/z value of 74 Da, measured at a scan rate, s, of 33 kDa/s.
Figure 8C:
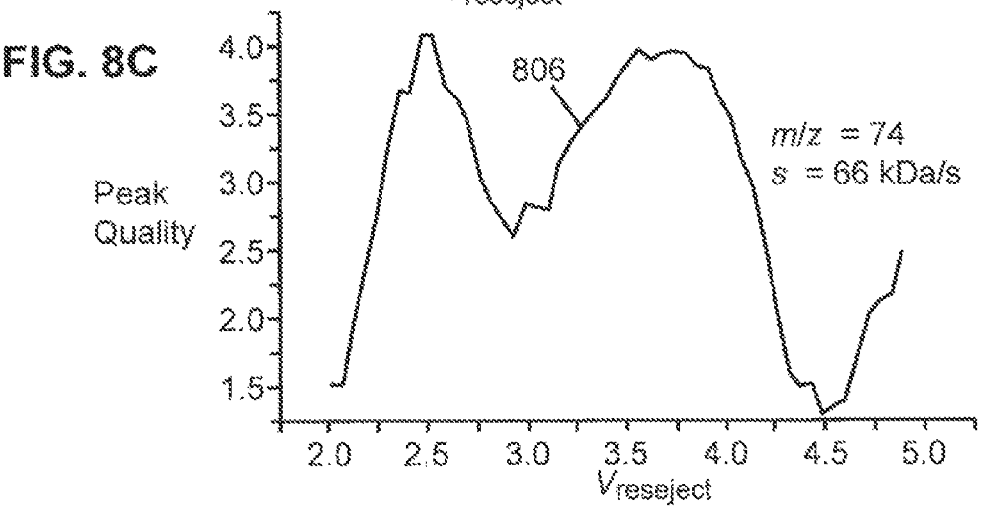
FIG. 8C is a graph of a peak quality parameter plotted vs. resonant ejection voltage as determined from experimental measurements of an ion type having an m/z value of 74 Da, measured at a scan rate, s, of 66 kDa/s.

The graphs in FIG. 8 illustrate the sensitivity of peak quality to variation in applied resonant ejection voltage, as determined by the inventors. These graphs illustrate a peak quality parameter plotted vs. resonant ejection voltage as determined from experimental measurements. The data plotted in FIG. 8A relate to an ion type having an m/z value of 138 Da, measured at a scan rate, s, of 33 kDa/s. Likewise, the data plotted in FIGS. 8B and 8C both relate to an ion type having an m/z value of 74 Da, measured at a scan rate, s, of 33 kDa/s and 66 kDa/s, respectively. These plots show that an error of the resonant ejection voltage as small as 0.4 V can have serious consequences for creating well-formed peaks with optimal characteristics; we therefore conclude that the Franzen method is not adequate for the purposes of providing a resonant ejection voltage calibration that provides optimal peak characteristics.

Figure 9:
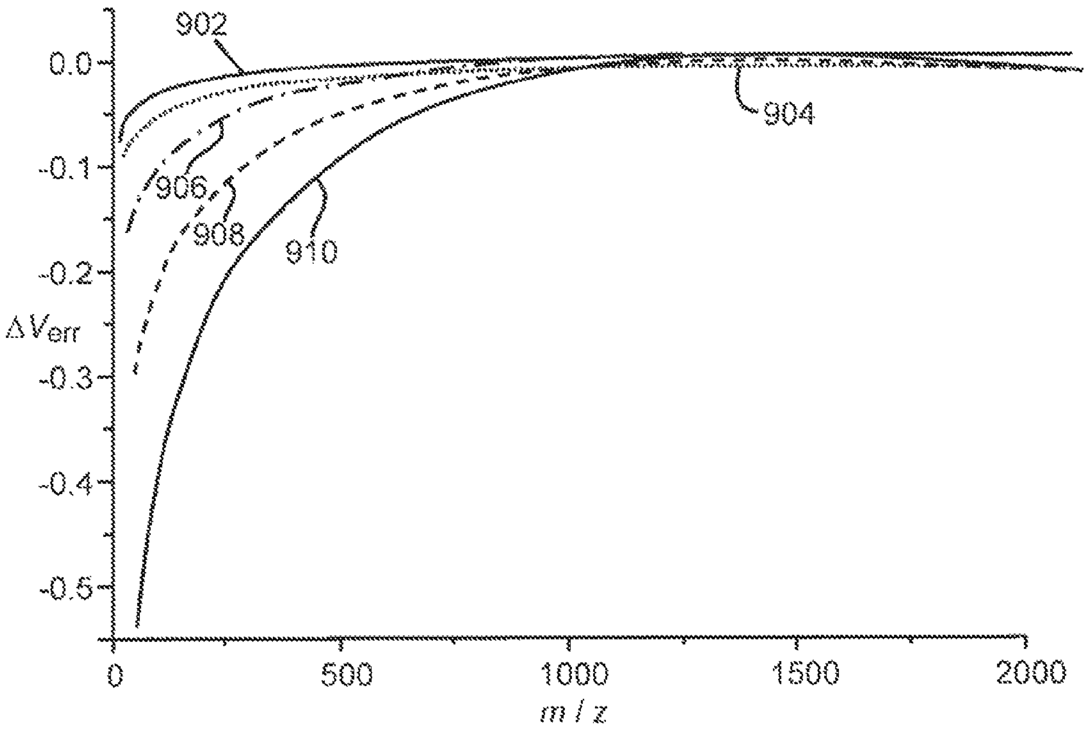
FIG. 9 is a graph of calculated voltage (Eq. 2) required to eject in constant time vs. m/z for various scan rates, in which a linear fit to the results, determined from m/z values greater than 1000, has been subtracted from all the results.

The effect of the mass-dependent initial ion amplitudes is compounded when fast scanning rates are used. This effect is calculated using Eq. 2 and the results of such calculations are shown in FIG. 9. In FIG. 9, the voltage deviation, $\Delta V_{reseject}$, relative to linearity, of the voltage necessary to eject ions of different masses in a given amount of time is calculated for different scan rates, where the initial ion positional amplitude has an inverse square root dependency (Eq. 5) and the ejection time for each scan rate is different. Curve 902 represents a scan rate of 10.0 kDa-sec$^{-1}$, curve 904 represents a scan rate of 16.7 kDa-sec$^{-1}$, curve 906 represents a scan rate of 33.3 kDa-sec$^{-1}$, curve 908 represents a scan rate of 66.7 kDa-sec$^{-1}$ and curve 910 represents a scan rate of 125.0 kDa-sec$^{-1}$. The reason for the larger absolute deviation at faster scan rates is because a larger absolute voltage is required to eject the ions in the shorter period of time. The calculations whose results are provided in FIG. 9 are supported by experimental data (see below) and also by more-sophisticated ion trajectory calculations.

Figure 10:
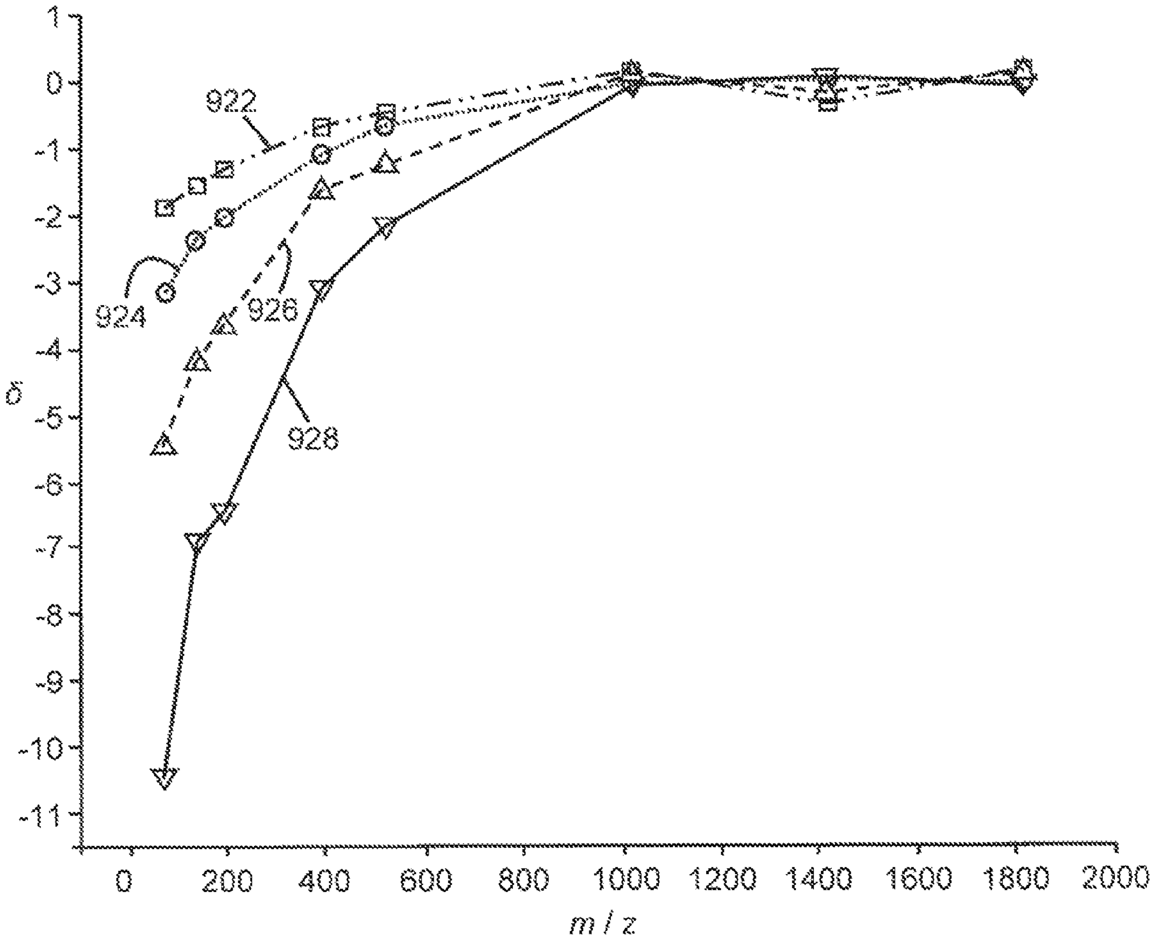
FIG. 10 is a plot of experimental voltage required to eject ions with optimal peak characteristics for various scan rates, in which a linear fit to the points, determined from m/z values greater than 1000, has been subtracted from all the points.
Figure 11A:
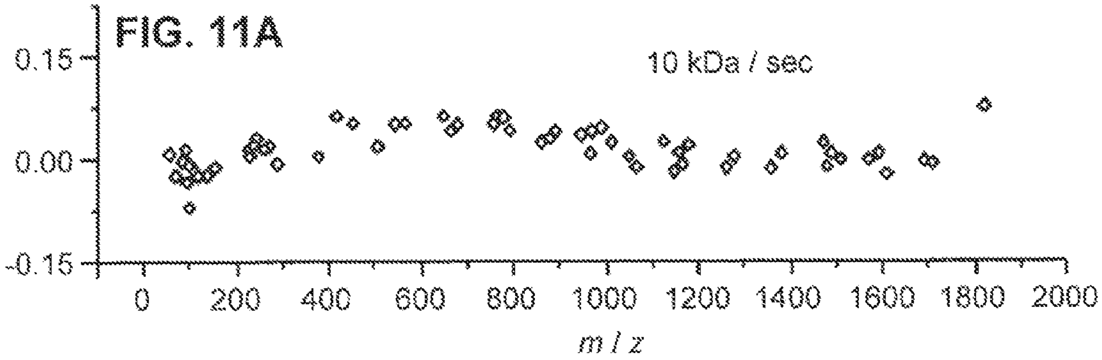
FIGS. 11A-11E provide a set of plots of experimental mass error deviations from linear fits above 1000 Da at various scan rates, when supplementary voltage is optimized.
Figure 11B:
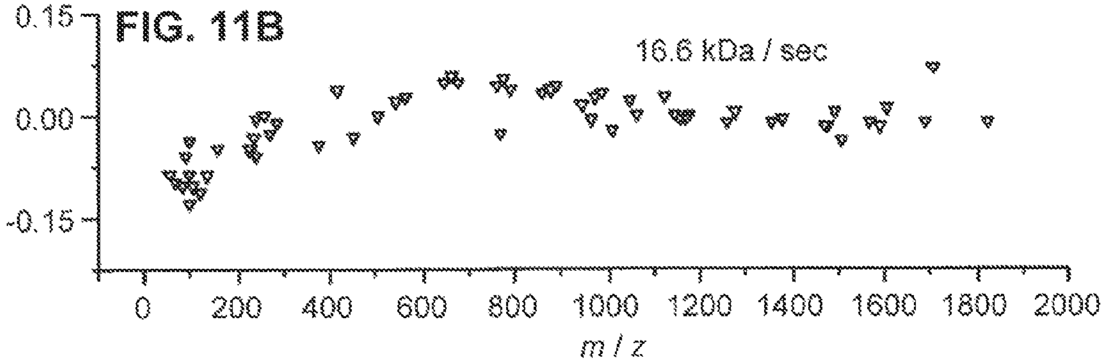
Figure 11C:
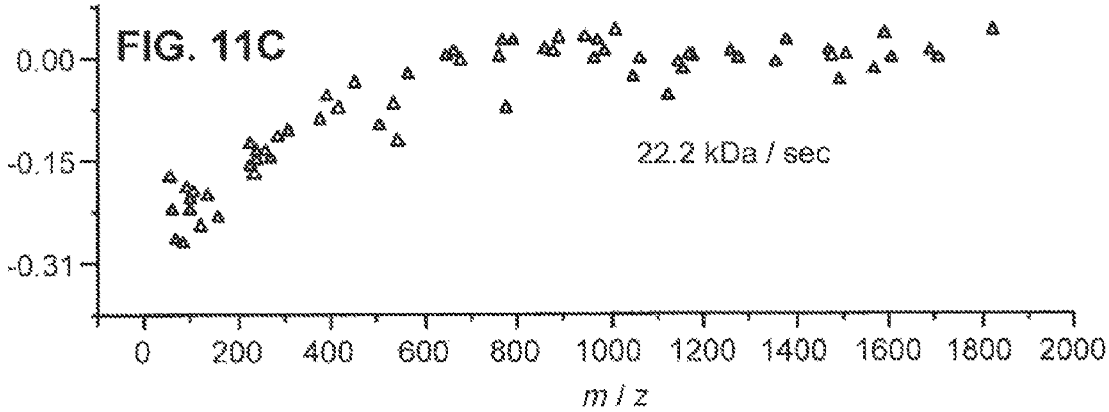
Figure 11D:
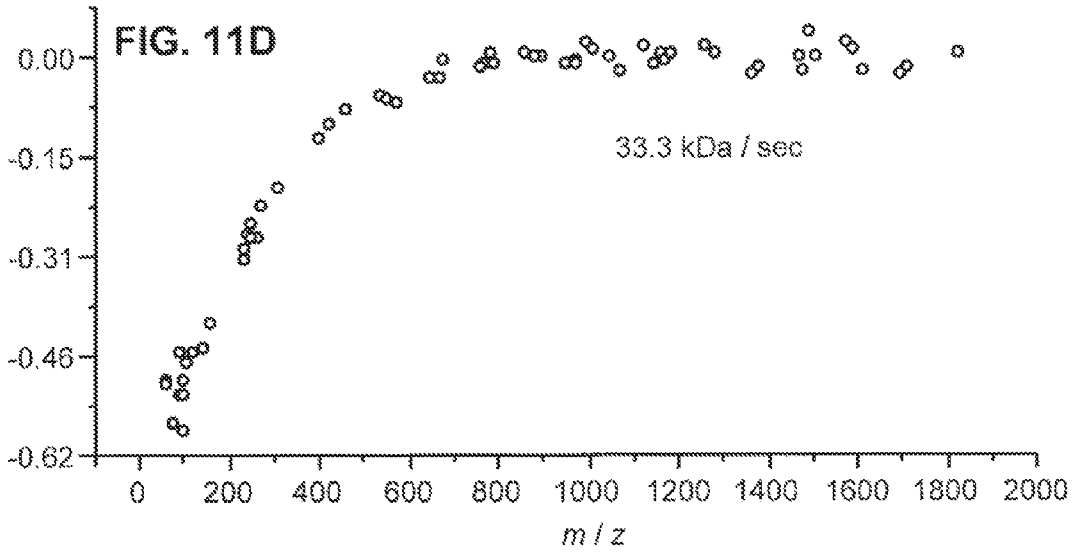
Figure 11E:
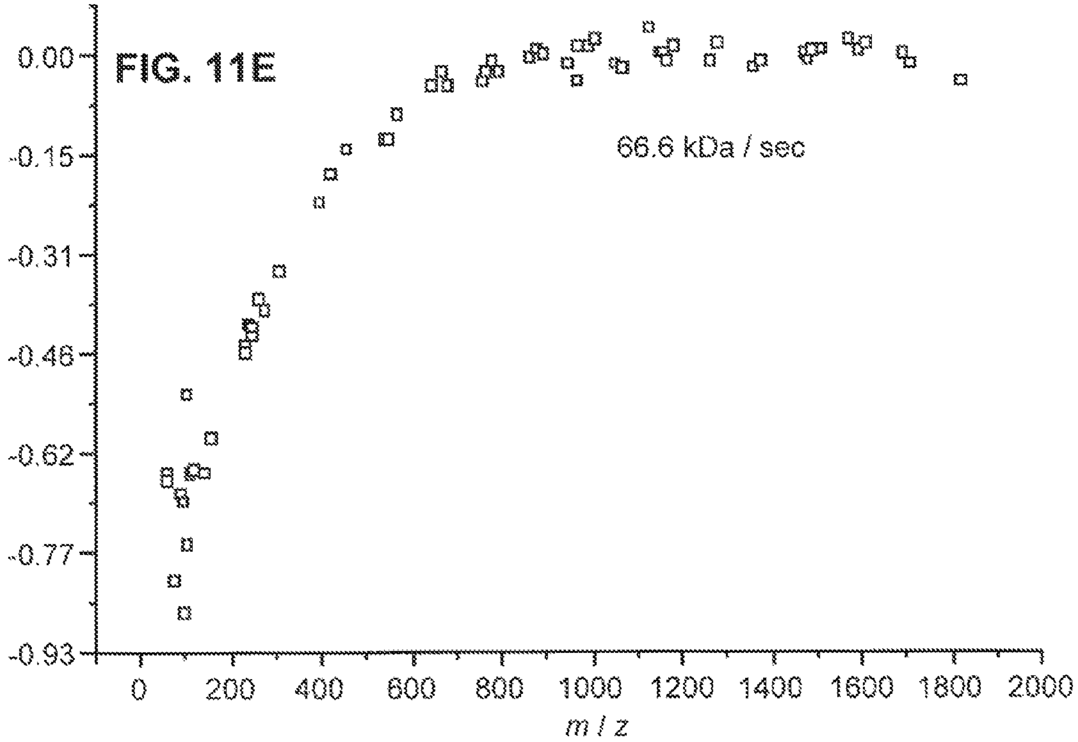
Figure 12:
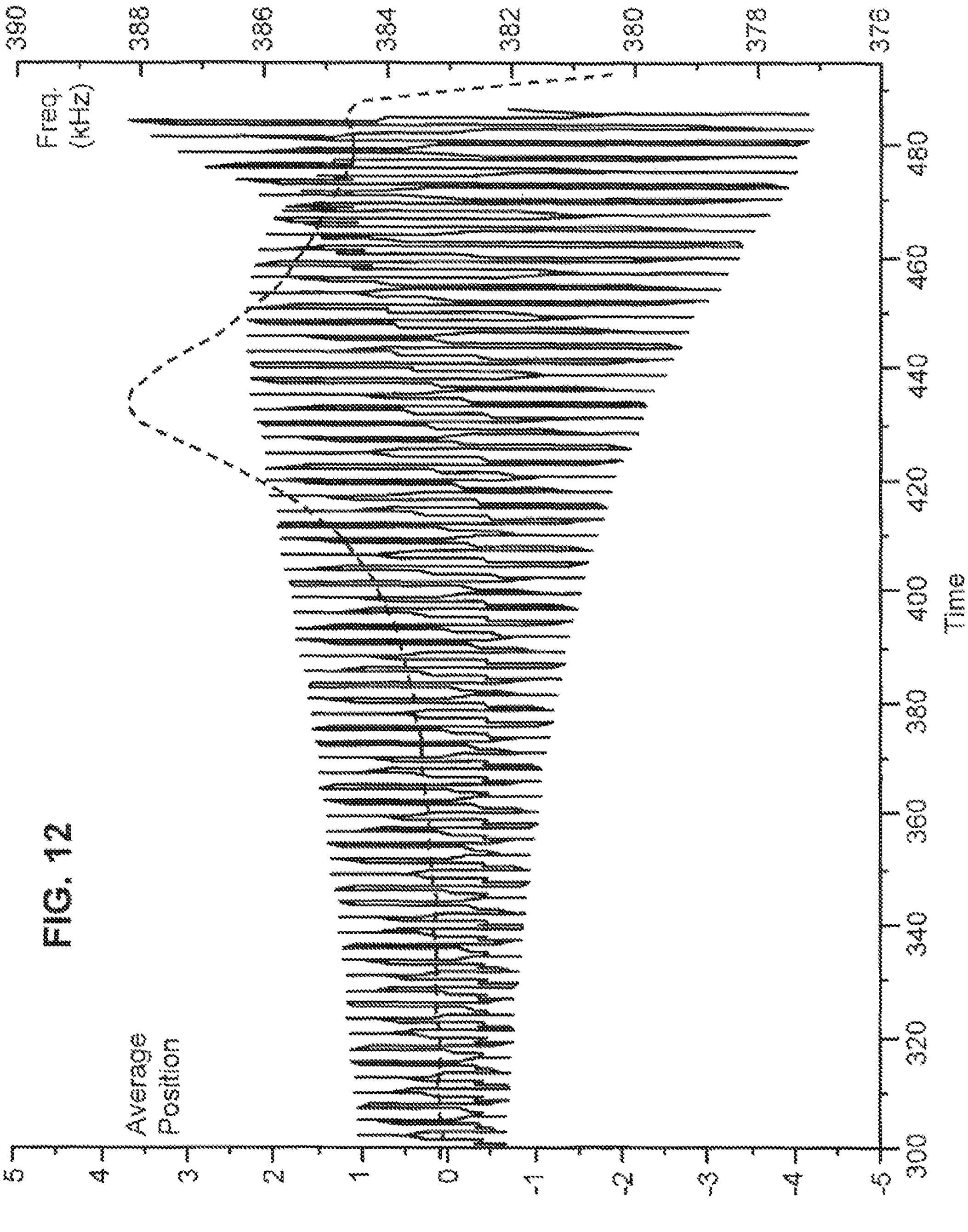
FIG. 12 is a set of graphs of the simulated average position of 10240 ions vs. time (solid line), and the reciprocal of the average oscillation period (dashed line)

FIG. 10 shows, for various different scan rates, experimental data for resonant ejection voltage deviation, $\Delta V_{reseject}$, required to optimize peak characteristics vs. mass. In FIG. 10, the plot 922 indicated by hollow rectangles connected by dash-dot lines represents a scan rate of 2.2 kDa-sec$^{-1}$, the plot 924 illustrated by hollow circles connected by dotted lines represents a scan rate of 10.0 kDa-sec$^{-1}$, the plot 926 illustrated by upward pointing hollow triangles connected by dashed lines represents a scan rate of 33.3 kDa-sec$^{-1}$ and the plot 928 illustrated by downward pointing hollow triangles represent a scan rate of 66.7 kDa-sec$^{-1}$. The same trend observed in FIG. 9 is also observed in FIG. 10, where larger deviations from a linear dependence are evident at the fastest scan rates. There is a good match between experiment and simulations, leading to the conclusion that peak characteristics are optimized by using a resonant ejection voltage that accounts for initial ion positions, such that ions of different masses are ejected very nearly in a constant amount of time. However, generating an optimized function for the resonant ejection voltage vs. mass is only one of the advantages provided by methods in accordance with the present teachings; the other advantage relates to maintaining mass accuracy even at high scan rates, as discussed in the following section.

Mass Accuracy Considerations

When both trapping RF and supplementary RF are scanned linearly with respect to time, gross mass accuracy errors are observed of more than 1 Da at a scan rate of 33 kDa/s. These errors may be reduced by varying the supplementary voltage in a nonlinear fashion, but some residual error persists. These errors for scan rates of 10.0 kDa/s, 16.6 kDa/s, 22.2 kDa/s, 33.3 kDa/s and 66.7 kDa/s are shown in FIGS. 11A-11E, respectively. A negative error corresponds to ions ejecting earlier than expected. We note that other factors will influence the magnitude of the deviation from mass linearity, in particular the pressure of the surrounding neutral gases. High pressures of gas not only will alter the ion initial size distributions, but also will broaden and attenuate the resonant frequency response. The rate of amplitude growth is slowed, diminishing the mass nonlinearity. Typically, however, high pressures cannot be used at fast scanning rates while simultaneously conserving acceptable peak resolution."

In order to develop a means to account for the mass errors illustrated in FIG. 11 in terms of a calibration, the limitations of the previously described simple, stationary harmonic oscillator model must now be considered. Eq. 2 is valid only at resonance in a linear system, that is, when the ion oscillation frequency exactly matches the resonant ejection frequency, and when the trapping force is linear with displacement from the center of the device. In reality, the ion frequency is not at resonance with the resonant ejection field and is not stationary, but approaches this excitation frequency at some rate. Near resonance, the phase relation between the ion and the excitation force shifts abruptly (Makarov, Anal. Chem. 1996, 68, 4257-4263, also Landau, Mechanics 3$^{rd}$ Ed., 1976). In numerical simulations, the shift in phase is accompanied by a marked increase in ion oscillation phase and amplitude. These abrupt changes make the last portion of the ion excitation process decidedly nonlinear in time. This effect can be observed in FIG. 12, where the simulated average ion position along the x coordinate is plotted versus time for the average of 10240 ion trajectories and is shown in the solid-line trace. In this same figure, the dashed-line trace is the ion oscillation frequency, estimated by taking the difference between position zero crossings. The simulations indicate that the ion frequency changes rapidly starting around 390 microseconds, at the same time that the growth in amplitude versus time begins to increase at a faster than linear rate. Although the results shown in FIG. 12 were simulated for a device having some small proportion of even-order non-linear field components, a similar effect is observed when the field is purely quadrupolar and calculated analytically.

Figure 13:
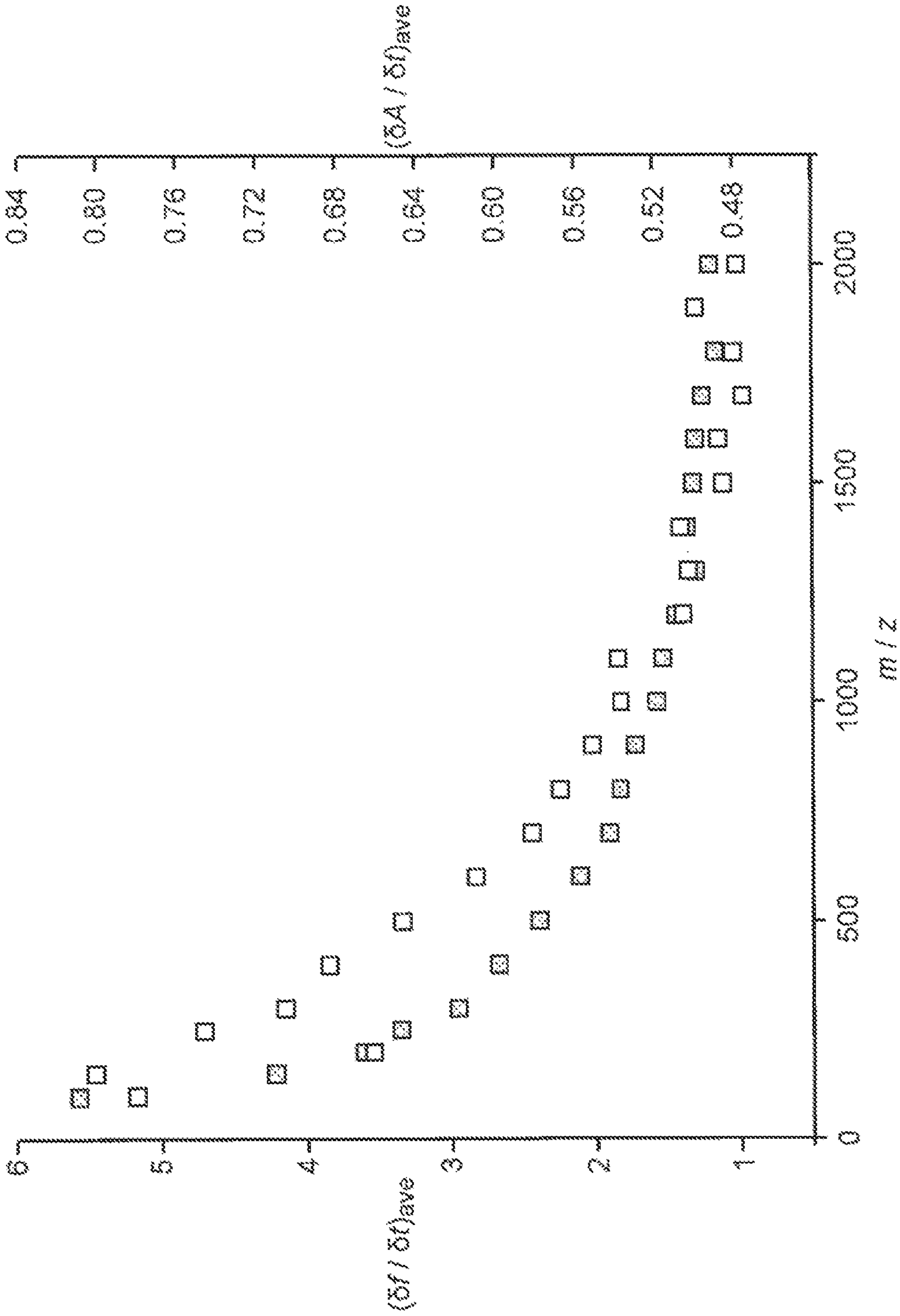
FIG. 13 is a plot of the simulated average change in amplitude and frequency for 200 microseconds before ejection.

The simulations noted above further indicate that the rate of change of amplitude and frequency near ejection is mass dependent, as is demonstrated in FIG. 13. In FIG. 13, the root-mean-square change in amplitude and frequency for the 200 microseconds before ejection is plotted vs. mass for ions ejected at a scan rate of 33 Da/s. The results plotted in FIG. 13 show that the low mass ions clearly change amplitude and frequency near ejection faster than do the high mass ions. Therefore, without being bound to any particular hypothesis or theory, it is reasonable to hypothesize that the slightly early ejection of the low mass ions observed in the data of FIG. 11 is due to these non-stationary effects. Alternatively, or in conjunction with non-stationary effects, the nonlinearity may be related to the effects of higher order fields, as predicted by Menon ("Frequency perturbation in nonlinear Paul traps: a simulation study of the effect of geometric aberration, space charge, dipolar excitation, and damping on ion axial secular frequency". Menon, IJMS 197 (2000), 263-278). Further analysis of this phenomenon is required to elucidate a rigorous model which contains physically relevant parameters. Nonetheless, the effects of this phenomenon can be mitigated by appropriate calibration in a straightforward manner. The deviations from linear ejection illustrated in FIG. 11 can be fit to many functions which exhibit a fast change for small values of the abscissa, and diminish towards larger values. For instance, Eqs. 7, 8 and 9, $$y_1(x) = \frac{p}{(1+qx)^r} \qquad \text{Eq. 7}$$

$$y_2(x) = \frac{p}{1+\left(\frac{x}{q}\right)^r} \qquad \text{Eq. 8}$$

$$y_3(x)=p\exp(rm) \qquad \text{Eq. 9}$$

where p, q and r are constants, are examples of three functions which fit the data in FIG. 9 very well. It is to be noted that both p and r in Eq. 9 are negative.

Terms of the form of either Eq. 7, Eq. 8 or Eq. 9 can be summed to the linear terms to give a mass scanning function (e.g., applied voltage vs. time or vs. mass) which gives optimum mass accuracy throughout the mass range, even at fast scan rates. For instance, a mass scanning function that is of the form of one of Eqs. 10-12, such as $$V_{RF}(m)=am+b+y_1(m) \qquad \text{Eq. 10}$$

$$V_{RF}(m)=am+b+y_2(m) \qquad \text{Eq. 11}$$

$$V_{RF}(m)=am+b+y_3(m) \quad \text{Eq. 12}$$

may be employed where $V_{RF}(m)$ is the applied RF trapping voltage, as a function of m, that is necessary to eject an ion having mass-to-charge ratio, m, and a and b are the usual constants applicable to linear equations of one variable. More generally, methods in accordance with the present teachings include the use of a mass scanning function that does not have a constant first derivative over the full scanning range.

Figure 14A:
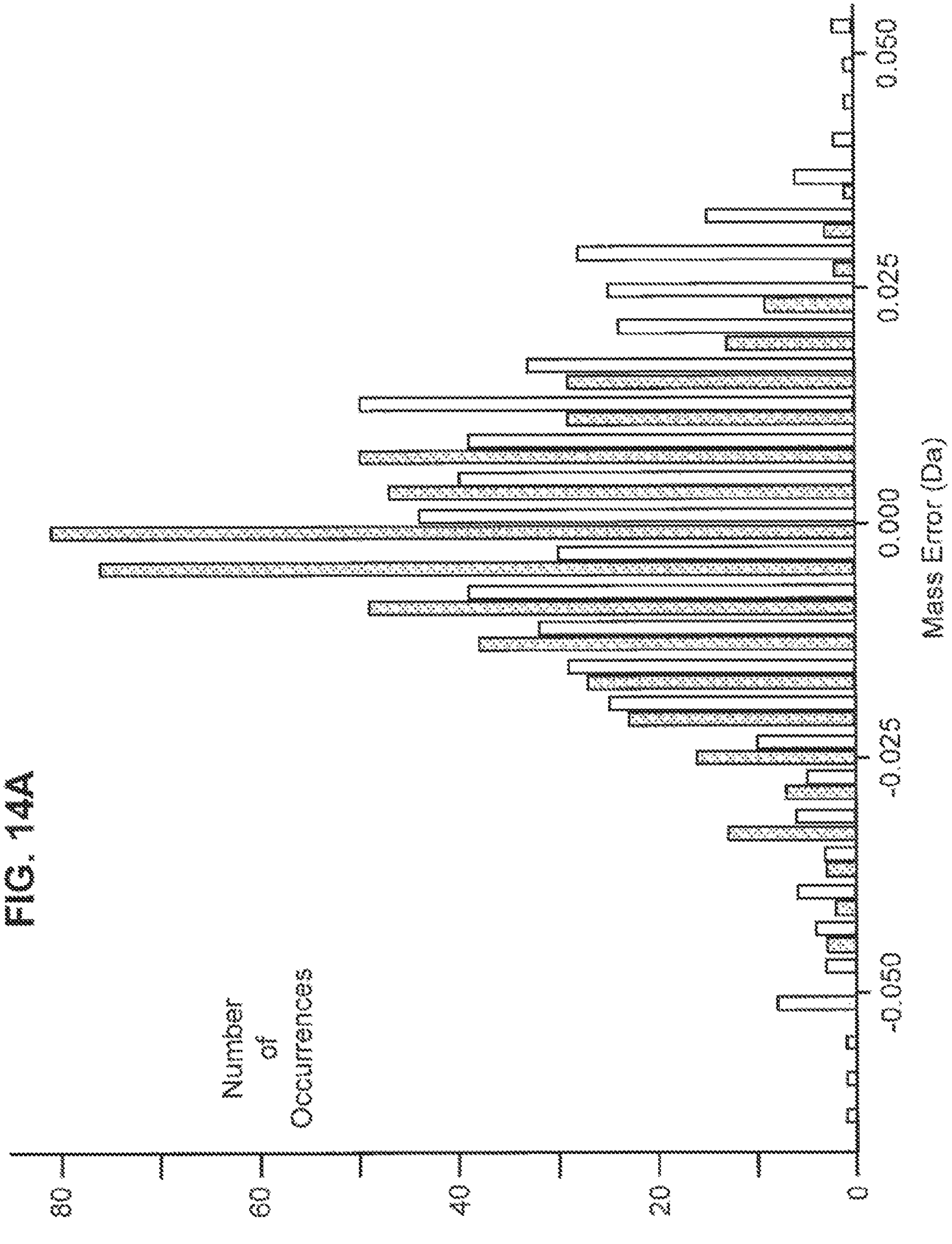
FIG. 14A is a histogram of experimental mass error for series of mass measurements across an entire mass range at different scan rates, using optimized supplementary and main RF scanning functions.
Figure 14B:
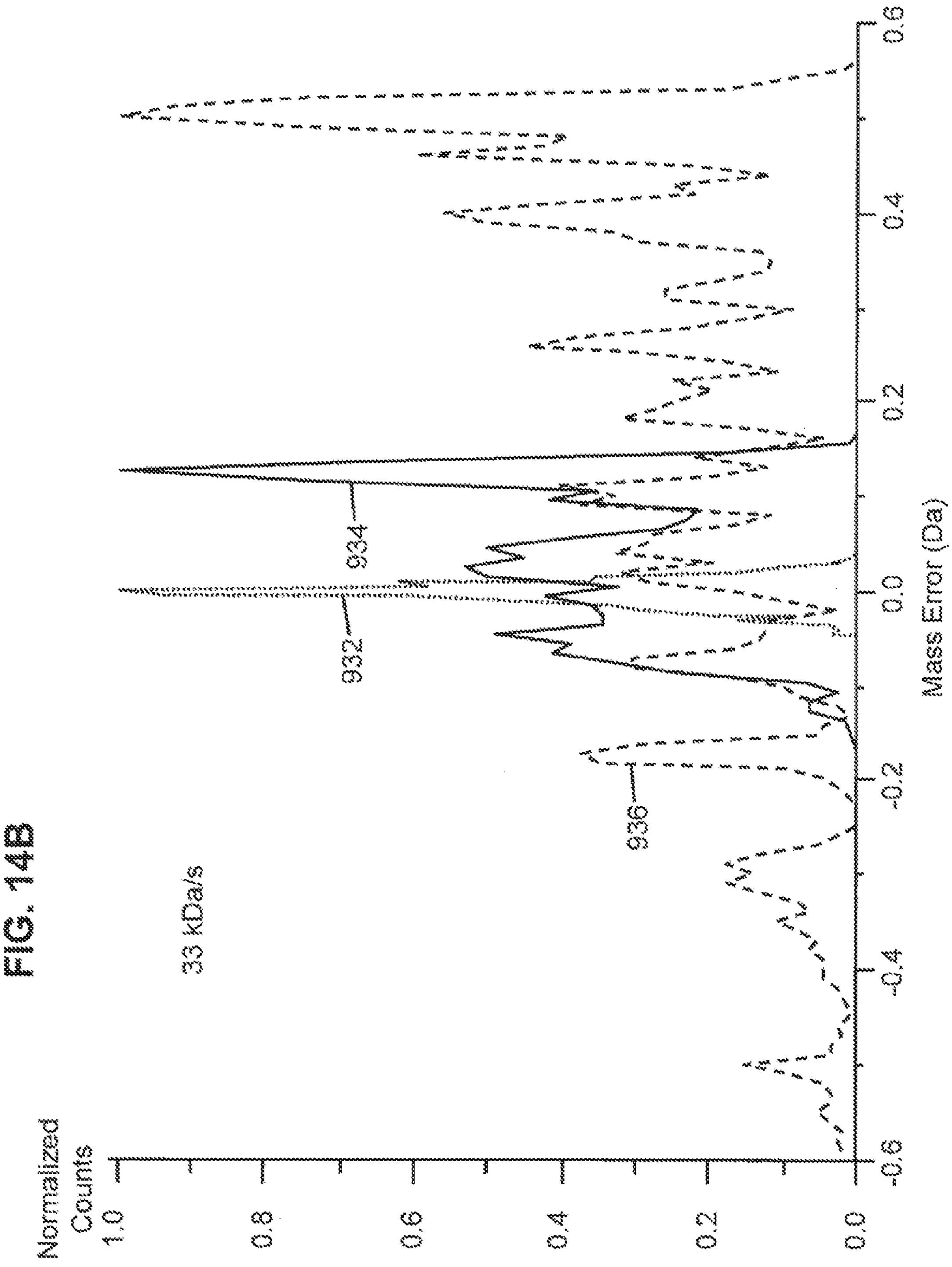
FIG. 14B is a set of histograms of experimental mass error for series of mass measurements across an entire mass range at a scan rate of 33 kDa/s obtained using different calibration methods.

Because of hardware or software limitations, scanning voltages with functional forms other than linear may be challenging or may not always be possible, and in such situations, a piecewise-linear scan which closely approximates the desired function could be implemented. The piecewise-linear scan, having discontinuities at the nodes, is not continuously differentiable, but its pieces all have constant first derivatives. Finally, as long as the supplementary voltage was varied in the manner proscribed earlier in this document to generate peaks with optimal peak characteristics, then the main RF could be scanned linearly and the residual mass errors eliminated by a software correction that uses a non-linear form, preferably a function of the form of Eqs. 10 or 11. FIG. 14A is a histogram that demonstrates the mass precision and accuracy obtained when using the optimized functions for the supplementary and main RF voltages. In this histogram, the shaded bars represent the number of occurrences of various mass errors using a scan rate of 33 kDa/sec and the hollow bars represent the number of occurrences of various mass errors using a scan rate of 66 kDa/sec. FIG. 14B is a set of histograms of experimental mass error for series of mass measurements across an entire mass range, all at a scan rate of 33 kDa/s, obtained using different calibration methods. The different scales of the mass error axes in FIGS. 14A-14B should be noted. In FIG. 14B, the dotted curve 932 is the same data shown by the shaded bars of FIG. 14A and shows the mass precision and accuracy obtained when using the optimized functions, as described herein, for both the supplementary (resonance ejection) and main RF voltages. The various "peaks" in the other curves 934, 936 were obtained by making many measurements of the same groups of compounds. The curve solid-line curve 934 represents mass errors when only the resonance ejection voltage is calibrated as described herein and a conventional linear mass-axis calibration is applied. The dashed-line curve 936 represents mass errors observed when both the resonance ejection voltage and the main RF voltage are calibrated according to conventional linear methods. The significantly reduced degree of mass error indicated by curve 932 thus represents a significant improvement over conventional calibration methods.

Calibration Method

It should be noted that, in this document, the term "ion type" refers to a category of ions such that all ions of a particular ion type category comprise the same atomic composition and charge. Thus, all ions of a particular ion type category are associated with a single mass-to-charge ratio. Calibrant ions are ions (i.e., charged particles) of any ion type and not necessarily comprising a single ion type that are used to calibrate an operational aspect or parameter of an analytical instrument. A calibrant material is a chemical compound or a mixture of compounds—either in solid, liquid or gaseous state or in solution in such a state—that, when ionized, gives rise to calibrant ions. Ionization of a single calibrant material may give rise to various ions comprising a plurality of ion types, even if the calibrant material comprises a single compound.

Figure 15A:
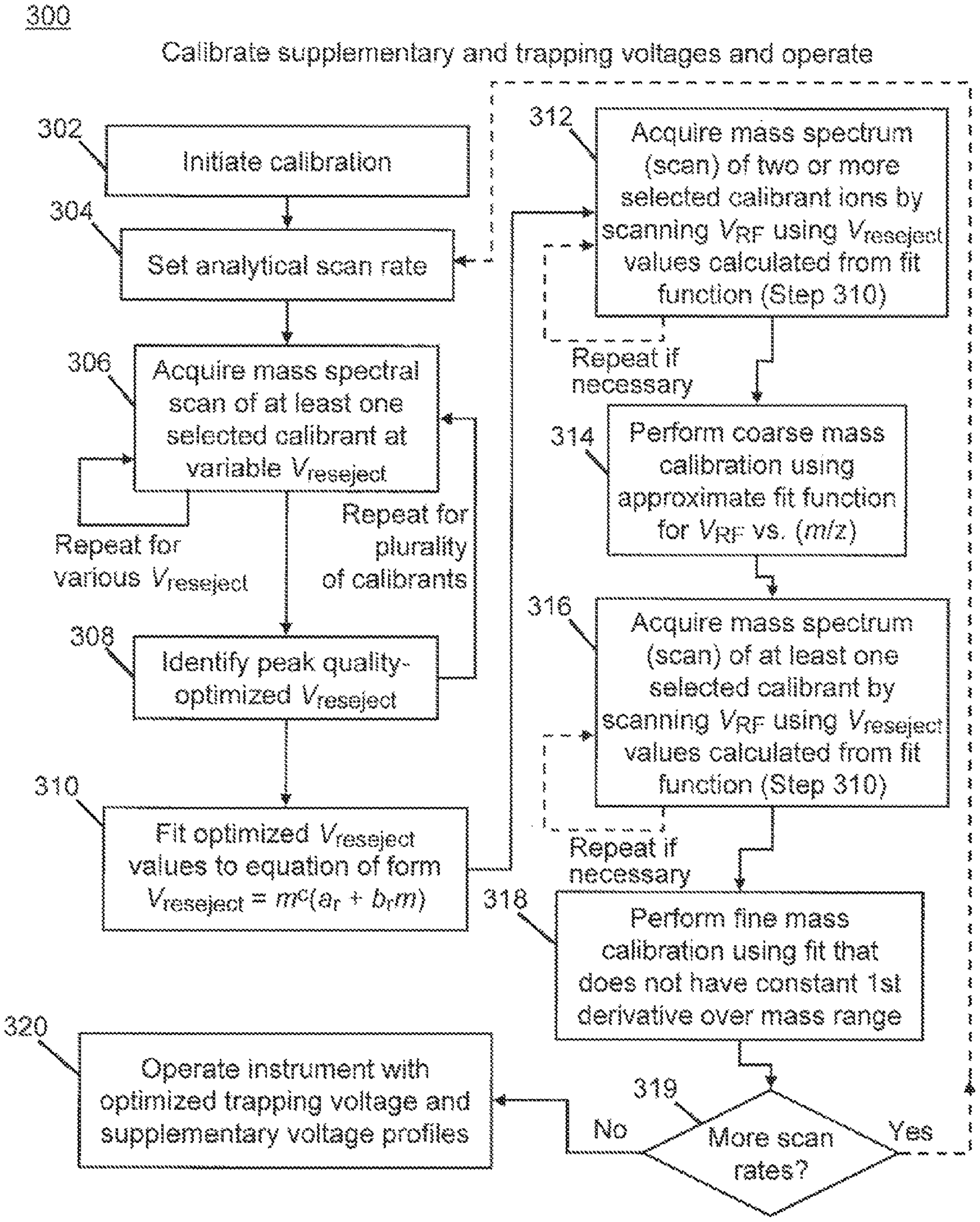
FIG. 15A is a flowchart of a first method for calibrating and operating an ion trap apparatus in accordance with the present teachings.

FIG. 15A illustrates a method 300 for calibrating and operating an ion trap apparatus in accordance with the present teachings. In the method 300, both the supplementary and RF trapping voltage amplitudes are calibrated and the instrument subsequently operated using the calibrations. In a first set of steps, Steps 302-310, a set of optimal supplementary resonant ejection voltages, $V_{reseject}$, are determined by the general procedure described in U.S. Pat. No. 7,804,065, with the data points comprising mass and voltage pairs being fit, in Step 310, to an equation of the form of Eq. 6 using a least-squares algorithm. In particular, Step 302 is a calibration initiation step that may occur automatically at prescribed intervals (e.g., once per month) or on the occurrence of certain events (e.g., power-up or replacement of an instrument component), or may be manually prompted by the instrument operator. Next, in Step 304, an analytical scan rate is set to one of the values available on the instrument. Many commercial ion trap mass spectrometers provide the operator with the ability to specify an analytical scan rate (typically expressed in units of Da/sec) based on performance requirements, notably throughput and resolution. In some mass spectrometers, switching between analytical scan speeds may be performed automatically in a data-dependent manner. In the subsequent Step 306, a plurality of analytical scans of ions produced from at least one known calibrant material, such as a calibration standard, are performed at different values of $V_{reseject}$ that span a range of interest, while holding the main trapping voltage and the scan rate fixed.

Each calibrant ion type may provide, in Step 308, a data point for an optimum value of $V_{reseject}$ at a particular value of mass-to-charge. In general, the optimum value of $V_{reseject}$ will be the value at which peak quality is observed to be optimal. The equations used to calculate peak quality may be predetermined in a software algorithm or may be selected or adjusted in accordance with operator input. Such input may include information identifying or weighing the importance of certain peak characteristics. To obtain a sufficient number of data points, Steps 306 and 308 may need to be repeated for a plurality of different calibration standards. In Step 310, the optimal $V_{reseject}$ values are fit to an equation of form $V_{reseject}$ $m^c(a_r+b_rm)$, where $a_r$, $b_r$, and c are constants, which may be determined by the fitting procedure, and with $c \approx 0.5$, for instance, $0.40 \leqq c \leqq 060$. The values of the constants in this equation may be stored for later use in calculating a value of the resonant ejection voltage at any mass.

In Step 312, data are acquired to perform a preliminary coarse mass calibration, which should give a mass accuracy of +/−1 Da over the entire mass range. This coarse calibration can be performed by observing, in Step 312, the trapping voltages, $V_{RF}$, required for ejection of two or more known calibrant ion types of differing m/z. The two or more calibrant ion types may be produced from at least one calibrant material by ionizing the material. The calibrant material or materials employed in this step may be the same as or different from the calibrant material or materials employed in Step 306. During this step, the supplementary resonant ejection voltage is maintained at a value appropriate for the m/z of each respective calibrant ion type, as calculated from the fit equation determined in Step 310. The calibrant ions comprise a set of known m/z values. The value of $V_{RF}$ associated with each such m/z value is recorded for subsequent use in the subsequent coarse mass calibration step, Step 314. Step 312 may be performed by introducing a mixture of calibrant ion types into the ion trap simultaneously such that a single mass scan over a great enough mass range will be sufficient to detect all of the calibrant ion types, each ion type having a different respective mass-to-charge ratio. Alternatively, Step 312 may be performed by introducing ions produced from each respective one of the various calibrant materials one-at-a-time into the ion trap. This may occur, for example, if the ions are generated from respective substances that elute from or come off of a chromatographic column according to different respective retention times. In such a case, Step 312 is repeated as necessary, in conjunction with each calibrant ion. In some situations, Step 312 may be performed by introducing ions produced from only a single calibrant material.

In Step 314, a preliminary mass scanning function, such as a linear function, is determined so as to provide a "coarse" or approximate fit to the values of m/z. in terms of $V_{RF}$. The values of the constants in the fit equation may be stored for use in the subsequent steps. Next a fine mass calibration is performed, which eliminates the residual mass errors. For best results, this should be done by measuring the ejection positions of known calibrant ion types at positions across the entire mass range. Accordingly, in Step 316, data are acquired so as to perform a fine calibration by acquiring one or more mass spectra of selected calibrant ion types. The calibrant ion types employed in this step may or may not be the same calibrant ion types employed in either Step 306 or Step 312. Likewise, the number of calibrant ion types or calibrant materials employed in Step 316 may or may not be the same as the number of calibrant ion types or materials employed in either Step 306 or Step 312. A convenient method is to include the use of tandem mass spectrometry, known as MS/MS, to fragment known calibrant precursor ions into known fragment ions, and measure their ejection positions thereby minimizing the number of compounds required in the calibration mixture. The calibrant ions comprise a set of known m/z values. The value of $V_{RF}$ associated with each such m/z value is recorded for subsequent use in the subsequent fine mass calibration step, Step 318.

The data comprising known m/z, ejection time pairs can then be fit, in Step 318, to a function that does not have constant first derivative over entire mass range to determine the mass scanning function which reduces mass error to the minimum level. For example, the fit function may be one of the forms described above in Eq. 10, Eq. 11 and Eq. 12. The instrument can then be operated (Step 320) using these calibrated relationships for supplementary and main RF voltage vs. mass for best performance. Alternatively, if there is a requirement to calibrate supplementary and trapping voltages in conjunction with other scan rates (Step 319), then before the instrument is operated, execution may branch back to step 304, in which a new analytical scan rate is set, and then the sequence of steps 306-318 is repeated in conjunction with the new scan rate.

The sequence of Steps 304-318 may be repeated any number of times so as to include any number of scan rates in the calibration. In fact, scan rate, s, may be treated as an independent experimental variable, with V reseject and $V_{RF}$ being considered as functions of the two variables m and s, such as $V_{reseject}=f_1(m, s)$ and $V_{RF}=f_2(m, s)$, where $f_1$ and $f_2$ are functions of two variables of any suitable form. In the context of the present discussion, it is convenient to consider the scan-rate dependence as completely absorbed into some or all of the various parameters $a_r$, $b_r$, c, a, b, p, q and r introduced previously herein. For instance, setting $a_r=g_1(s)$, $b_r=g_2(s)$, and $c=g_3(s)$, where the functions $g_1$, $g_2$, and $g_2$ are functions only of the scan rate variable s, then the formula for V reseject (Eq. 6) becomes $$V_{reseject}=m^{g3(s)}(g_1(s)+g_2(s)\times m) \quad \text{Eq. 6b}$$

and the various expressions for $V_{RF}$ (e.g., Eqs. 10-12) may be modified similarly. As one example, the functions $g_1(s)$, $g_2(s)$, and $g_3(s)$ may be simple linear or polynomial functions of scan rate, s. During each iteration of the steps 304-318 at a respective scan rate, new respective values for each of the various parameters ($a_r$, $b_r$, c, etc.) will, in general, be calculated. The various calculated values for each parameter may be then fit to the respective model function of the form $g_1(s)$, $g_2(s)$, $g_3(s)$, etc. The benefits of such a procedure would then be improved statistics relating to the mass-axis calibration at any given scan rate, and the possibility of using a continuous range of usable scan rates instead of a finite discrete set.

Figure 15B:
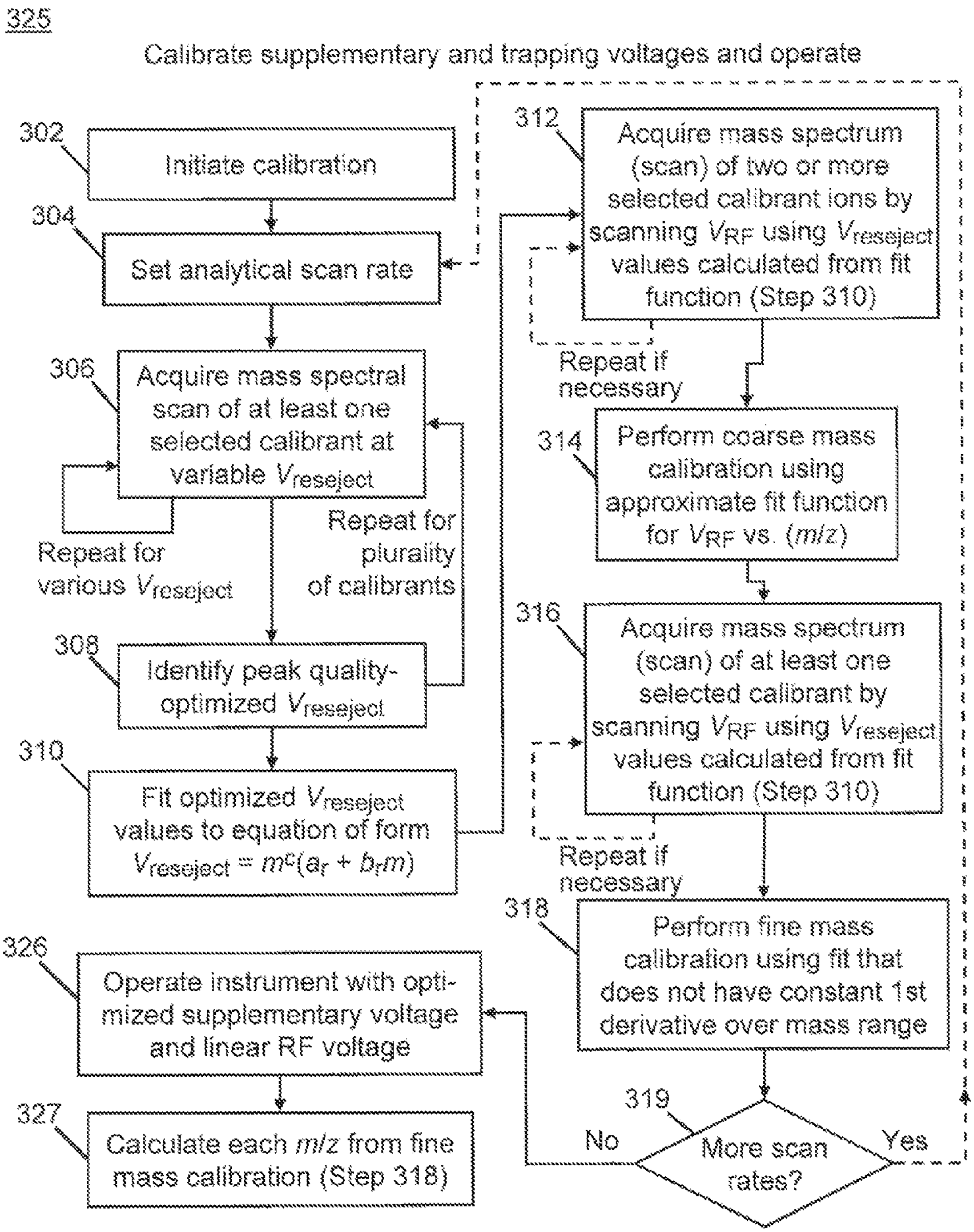
FIG. 15B is a flowchart of a second method for calibrating and operating an ion trap apparatus in accordance with the present teachings.

Returning to the general discussion of the method 300, in the instrument operation stage (Step 320) illustrated in FIG. 15A, the trapping voltage, $V_{RF}$, is ramped non-linearly in time so as to cause ions to be ejected such that the m/z of ejected ions does vary, in fact, linearly with time—that is, at the pre-determined analytical scan rate. In such operation, the non-linear ramping of $V_{RF}$ accounts for the functional form of the relationship between mass and voltage as is noted herein, such as, for instance the functional form of any one of Eqs. 10-12. Alternatively, the trapping voltage, $V_{RF}$, may be simply ramped linearly with time. Although this alternative operation is less complex, the m/z values of ejected ions are, in this instance, not linear with time. Nonetheless, the correct m/z values may be calculated using the calibrations previously performed, e.g., in Step 318. A flow chart for this mode of operation is shown in FIG. 15B as method 325. The Steps 302-319 of the method 325 (FIG. 15B) are identical to the similarly numbered steps of method 310 (FIG. 15A). However, the Step 320 is replaced by Steps 326 and 327. In Step 326, the instrument is operated with the optimized supplementary voltage and the RF voltage is ramped linearly. In Step 326, the correct m/z value corresponding to each value of $V_{RF}$ is calculated.

Figure 15C:
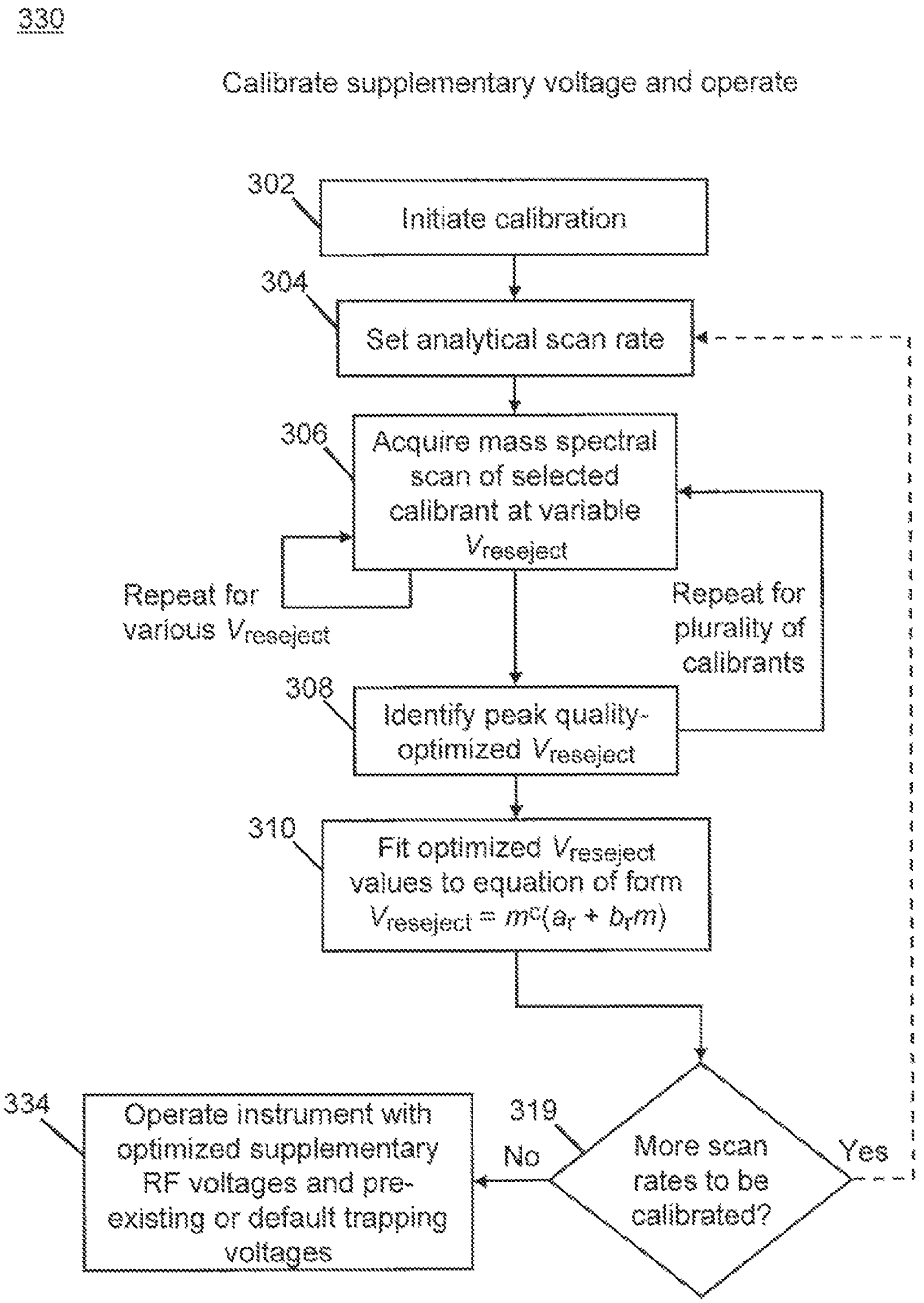
FIG. 15C is a flowchart of a third method for calibrating and operating an ion trap apparatus in accordance with the present teachings.
Figure 15D:
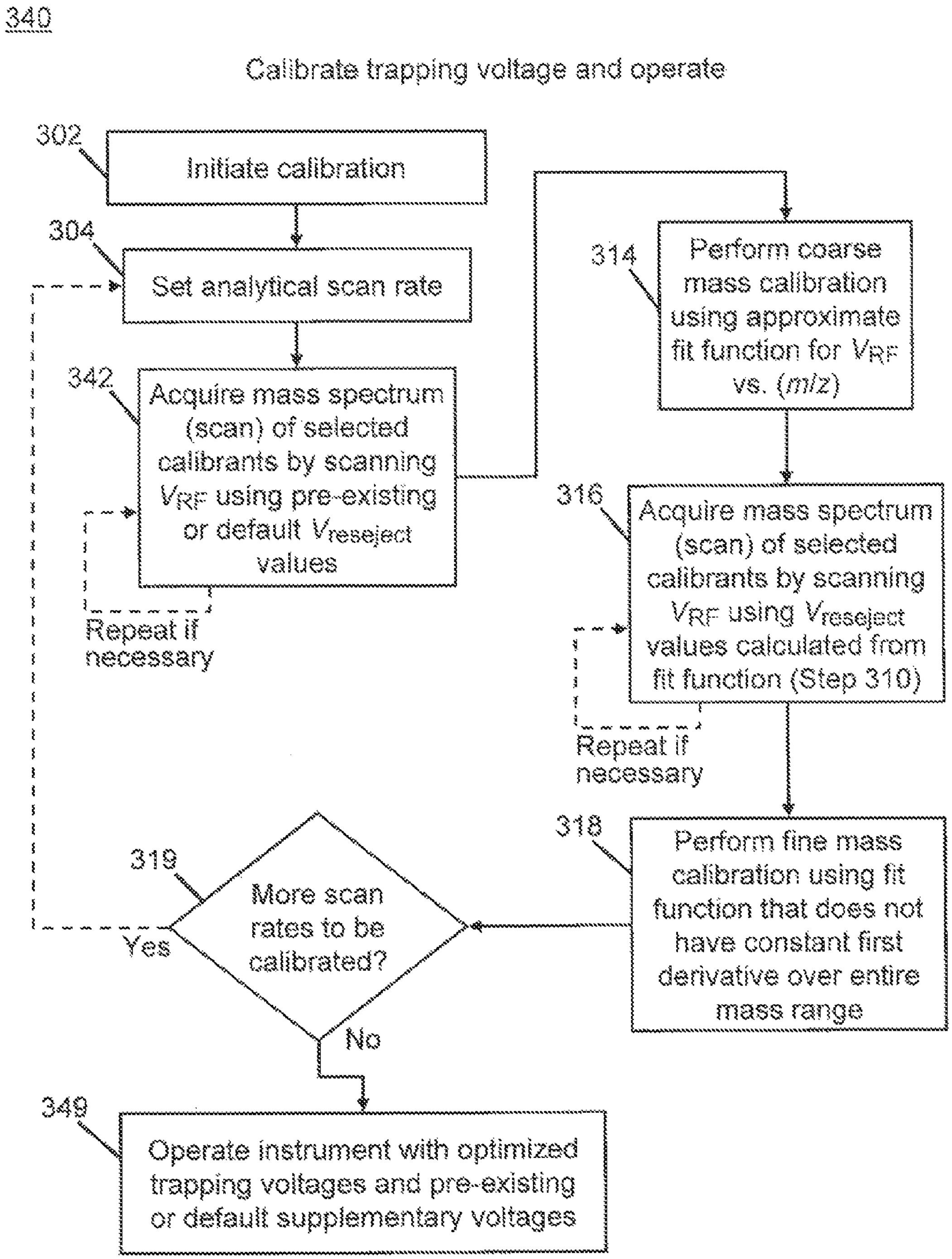
FIG. 15D is a flowchart of a fourth method for calibrating and operating an ion trap apparatus in accordance with the present teachings.

FIGS. 15C-15D illustrate alternative methods in accordance with the present teachings. In the method 330 (FIG. 15C), only the supplementary voltage amplitude is calibrated. Accordingly, the method 330 comprises the same Steps 302-319 as in method 300 (FIG. 15A) but Steps 312-316 and Step 320 are omitted. Instead, the method 330 includes the Step 334 in which the instrument is operated in conjunction with the newly calibrated supplementary voltage but using a trapping voltage relying on a pre-existing or default calibration. This type of operation may be suitable for use in situations in which a precise or accurate mass calibration is of secondary importance, such as in some screening operations, where only the presence or absence of certain peaks is significant.

In the method 340 (FIG. 15D), only the trapping voltage amplitude is calibrated. Accordingly, the method 340 comprises the same Steps 302-304 and Steps 314-319 as in method 300 (FIG. 15A) but Steps 306-310 and Step 320 are omitted. Instead, the method 340 includes the new Steps 342 and 349. In Step 342, a mass spectrum or scan of selected calibrant ion types is acquired by scanning $V_{RF}$ using pre-existing or default supplementary voltage amplitude values $V_{reseject}$, since supplementary voltage is not re-calibrated in this method. In Step 349 the instrument is operated in conjunction with the newly calibrated trapping voltage but using a supplementary voltage relying on the pre-existing or default calibration. This type of operation may be suitable for use in situations in which optimal peak shapes or other characteristics are not of primary importance.

CONCLUSIONS

Maintaining optimal peak characteristics and mass accuracy on a fast scanning quadrupole ion trap mass spectrometer is a task which cannot be performed with a linear scan of supplementary resonance ejection voltage. The voltage which optimizes peak characteristics is the one where each ion nominally is ejected in the same amount of time. For this, the initial distribution of ion positions must be accounted for, which has an inverse square root dependency and is pressure dependant. Therefore, the best resonant ejection voltage can be found as the product of a first voltage function that varies as the square root of mass-to-charge ratio with a second voltage function that varies linearly with mass-to-charge ratio. The resulting resonance ejection voltage function is an equation of the form of $V=m^c(a+bm)$ where V is an applied voltage, m is mass-to-charge ratio and a, b and c are constants determined by calibration. Although varying the resonant ejection voltage in this manner eliminates a portion of the mass errors, residual errors are observed, likely due to the non-stationary excitation process. With the resonance ejection voltage varying in this manner, the residual mass errors can be compensated for, if necessary, by a mass scan whose functional form deviates from linear at low mass, and approaches linear at high mass. More generally, the scanning function can be said to not comprise a constant first derivative over the full mass range of the scanning. Alternatively, the main RF can be scanned linearly, and the residual mass errors can be eliminated through a software correction having the same functional form.

The discussion included in this application is intended to serve as a basic description. Although the present invention has been described in accordance with the various embodiments shown and described, one of ordinary skill in the art will readily recognize that there could be variations to the embodiments and those variations would be within the spirit and scope of the present invention. The reader should be aware that the specific discussion may not explicitly describe all embodiments possible; many alternatives are implicit. Accordingly, many modifications may be made by one of ordinary skill in the art without departing from the spirit, scope and essence of the invention. Neither the description nor the terminology is intended to limit the scope of the invention. All patent application disclosures, patent application publications or other publications are hereby explicitly incorporated by reference herein as if fully set forth herein.

What is claimed is:

1. A method of calibrating an ion trap mass analyzer having a plurality of electrodes to which a main RF trapping voltage and a resonant ejection voltage are applied during operation of the ion trap mass analyzer, the method comprising steps of:

(a) selecting an analytical scan rate at which to operate the mass spectrometer;

(b) identifying, for each of a plurality of ion types produced from at least one calibrant material and having respective mass-to-charge ratios, an optimum resonant ejection voltage amplitude at which a mass peak quality value is optimized when the ion trap mass analyzer is operated at the selected scan rate, the mass peak quality value representative of one or more mass peak characteristics observed during operation of the ion trap mass analyzer;

(c) determining a best-fit function from the identified optimum resonant ejection voltage amplitudes and the mass-to-charge ratios, the best-fit function of the form $V_{reseject}=m^c(a_r+b_rm)$, where $V_{reseject}$ is a variable representing resonant ejection voltage amplitude, m is a variable representing mass-to-charge ratio and $a_r$, $b_r$ and c are constants determined by a fitting procedure, such that $0.40 \leqq c \leqq 0.60$; and (d) storing information representing the best-fit function derived in step (c).

2. A method of calibrating an ion trap mass analyzer as recited in claim 1, wherein the step (b) of identifying, for each of the plurality of ion types having respective mass-to-charge ratios, an optimum resonant ejection voltage amplitude comprises:

(b1) acquiring a plurality of mass spectra of a selected calibrant material such that the ion trap mass analyzer is operated at the selected scan rate, wherein each of the mass spectra corresponds to operation of the ion trap mass analyzer at different respective Vreseject value; and (b2) calculating, for each of the plurality of acquired mass spectra, a mass peak-quality value derived from one or more peak characteristics chosen from the group consisting of peak height, peak width, inter-peak valley depth, peak symmetry, spacing of related peaks representing an isotopic distribution and peak position.

3. A method of calibrating an ion trap mass analyzer as recited in claim 1 wherein the method is automatically initiated either at prescribed intervals or on the occurrence of prescribed events.

4. A method of calibrating an ion trap mass analyzer as recited in claim 1, further comprising the steps of:

(e) identifying, for each of a plurality of ion types produced from at least one calibrant material and having respective mass-to-charge ratios, a respective trapping voltage amplitude at which ions of each said ion type are ejected from the ion trap mass analyzer when the ion trap mass analyzer is operated at the selected scan rate and employing a resonant ejection voltage calculated according to the information stored in step (d);

(f) determining a second best-fit function from the identified trapping voltage amplitudes and the mass-to-charge ratios of the plurality of ion types employed in step (e), the second best-fit function being of a form that yields an RF trapping voltage amplitude that is required to eject an ion having mass-to-charge ratio, m, from the ion trap mass analyzer; and (g) storing information representing the second best-fit function derived in step (f).

5. A method of calibrating an ion trap mass analyzer as recited in claim 4, wherein the step (f) of determining the second best-fit function comprises determining the second best-fit function such that said function does not have a constant first derivative over a full scanning range of the ion trap mass analyzer.

6. A method of calibrating an ion trap mass analyzer as recited in claim 4, wherein the step (f) of determining the second best-fit function comprises determining the second best-fit function so as to have a form chosen from the group consisting of $$V_{RF}(m) = am + b + \frac{p}{(1+qm)^r},$$

$$V_{RF}(m) = am + b + \frac{p}{1+(m/q)^r}$$

and $V_{RF}(m)=am+b+p\exp(rm)$ where a, b, p, q and r are constants determined by a second fitting procedure, and $V_{RF}(m)$ is an applied RF trapping voltage amplitude that is required to eject an ion having mass-to-charge ratio, m, from the ion trap mass analyzer when the ion trap mass analyzer is operated at the selected scan rate and employing a resonant ejection voltage amplitude calculated according to the information stored in step (d).

7. A method of calibrating an ion trap mass analyzer as recited in claim 4, wherein the step (f) of determining the second best-fit function comprises determining the second best-fit function as a piecewise linear function.

8. A method of calibrating an ion trap mass analyzer as recited in claim 4, wherein a portion of the plurality of ion types employed in step (e) correspond to precursor ions and another portion of the plurality of ion types employed in step (e) correspond to fragment ions produced by fragmentation of the precursor ions.

9. A method of calibrating an ion trap mass analyzer as recited in claim 4, wherein the step (f) of determining the second best-fit function comprises the steps of:

(f1) acquiring a plurality of mass spectra of a first set of ions of the plurality of ion types employed in step (e) by scanning the trapping voltage amplitude while operating the ion trap mass analyzer at the selected scan rate and employing resonant ejection voltages calculated according to the information stored in step (d);

(f2) determining an approximate fit function using results obtained in step (f1), the approximate fit function being of a form that yields an approximate applied RF trapping voltage amplitude that is required to eject an ion having mass-to-charge ratio, m, from the ion trap mass analyzer;

(f3) acquiring a plurality of mass spectra of a second set of ions of the plurality of ion types employed in step (e) by scanning the trapping voltage amplitude while operating the ion trap mass analyzer at the selected scan rate, employing resonant ejection voltages calculated according to the information stored in step (d) and employing the approximate fit function calculated in step (f2); and (f4) calculating the second best-fit function using results obtained in step (f3).

10. A method of calibrating an ion trap mass analyzer as recited in claim 1 comprising:

selecting a second analytical scan rate at which to operate the mass spectrometer; and repeating steps (b)-(d) using the second selected analytical scan rate.

11. A method of calibrating an ion trap mass analyzer as recited in claim 4 comprising:

selecting a second analytical scan rate at which to operate the mass spectrometer; and repeating steps (b)-(g) using the second selected analytical scan rate.

12. An ion trap mass spectrometer, comprising:

(i) a plurality of electrodes defining an interior volume for receiving and trapping ions;

(ii) a main RF trapping voltage source for applying an RF trapping voltage to at least a portion of the plurality of electrodes;

(iii) a resonant ejection voltage source for applying a resonant ejection voltage to at least a portion of the plurality of electrodes; and (iv) a controller, coupled to the RF trapping voltage and the resonant ejection voltage source, configured to perform steps of:

(a) setting an analytical scan rate at which to operate the mass spectrometer;

(b) identifying, for each of a plurality of ion types produced from at least one calibrant material and having respective mass-to-charge ratios, an optimum resonant ejection voltage amplitude at which a mass peak quality value is optimized when the ion trap mass analyzer is operated at the selected scan rate, the mass peak quality value representative of one or more mass peak characteristics observed during operation of the ion trap mass analyzer;

(c) determining a best-fit function from the identified optimum resonant ejection voltage amplitudes and the mass-to-charge ratios, the best-fit function of the form $V_{reseject}=m^c(a_r+b_r m)$ where $V_{reseject}$ is a variable representing resonant ejection voltage amplitude, m is a variable representing mass-to-charge ratio and $a_r$, $b_r$ and c are constants determined by a fitting procedure, such that $0.40 \leqq c \leqq 0.60$; and (d) storing information representing the best-fit function derived in step (c).

13. An ion trap mass spectrometer as recited in claim 12, wherein the controller is further configured to perform the further steps of:

(e) identifying, for each of a plurality of ion types produced from at least one calibrant material and having respective mass-to-charge ratios, a respective trapping voltage amplitude at which ions of each said ion type are ejected from the ion trap mass analyzer when the ion trap mass analyzer is operated at the selected scan rate and employing a resonant ejection voltage calculated according to the information stored in step (d);

(f) determining a second best-fit function from the identified trapping voltage amplitudes and the mass-to-charge ratios of the plurality of ion types employed in step (e), the second best-fit function being of a form that yields an RF trapping voltage amplitude that is required to eject an ion having mass-to-charge ratio, m, from the ion trap mass analyzer; and (g) storing information representing the second best-fit function derived in step (f).

14. An ion trap mass spectrometer as recited in claim 13, wherein the step (f) comprises determining the second best-fit function so as to have a form chosen from the group consisting of $$V_{RF}(m) = am + b + \frac{p}{(1+qm)^r},$$

$$V_{RF}(m) = am + b + \frac{p}{1+(m/q)^r}$$

and $V_{RF}(m)=am+b+p\exp(rm)$ where a, b, p, q and r are constants determined by a second fitting procedure, and $V_{RF}(m)$ is an applied RF trapping voltage amplitude that is required to eject an ion having mass-to-charge ratio, m, from the ion trap mass analyzer when the ion trap mass analyzer is operated at the selected scan rate and employing a resonant ejection voltage amplitude calculated according to the information stored in step (d).

15. An ion trap mass spectrometer as recited in claim 13, wherein the step (f) comprises determining the second best-fit function such that said function does not have a constant first derivative over a full scanning range of the ion trap mass spectrometer.

16. A method of calibrating and operating an ion trap mass spectrometer having a plurality of electrodes to which a main RF trapping voltage and a resonant ejection voltage are applied during operation of the ion trap mass analyzer, the method comprising the steps of:

(a) selecting an analytical scan rate at which to operate the mass spectrometer;

(b) identifying, for each of a plurality of ion types produced from at least one calibrant material and having respective mass-to-charge ratios, an optimum resonant ejection voltage amplitude at which a peak quality value is optimized when the ion trap mass analyzer is operated at the selected scan rate, the peak quality value representative of one or more mass peak characteristics observed during operation of the ion trap mass spectrometer;

(c) determining a best-fit function from the identified optimum resonant ejection voltage amplitudes and the mass-to-charge ratios, the best-fit function of the form $V_{reseject}=m^c(a_r+b_rm)$, where $V_{reseject}$ is a variable representing resonant ejection voltage amplitude, m is a variable representing mass-to-charge ratio and $a_r$, $b_r$ and c are constants determined by a fitting procedure, such that $0.40 \leqq c \leqq 0.60$;

(d) storing information representing the best-fit function derived in step (c); and (e) operating the ion trap mass spectrometer to analyze a sample using a resonant ejection voltage amplitude that varies with the mass-to-charge ratio of sample ion types ejected from the ion trap, said variation relating to the best-fit function determined in step (c).

17. A method of calibrating and operating an ion trap mass spectrometer as recited in claim 16, wherein the step (e) comprises operating the ion trap mass analyzer to analyze a sample using a resonant ejection voltage amplitude that varies with the mass-to-charge ratio of sample ions ejected from the ion trap, wherein said variation comprises a piecewise-linear approximation to the best-fit function determined in step (c).

18. A method of calibrating and operating an ion trap mass spectrometer having a plurality of electrodes to which a main RF trapping voltage and a resonant ejection voltage are applied during operation of the ion trap mass analyzer, the method comprising the steps of:

(a) identifying, for each of a plurality of ion types produced from at least one calibrant material and having respective mass-to-charge ratios, a respective trapping voltage amplitude at which ions of each ion type of the plurality of ion types are ejected from the ion trap mass analyzer when the ion trap mass analyzer is operated at a selected scan rate and employing a pre-determined resonant ejection voltage profile;

(b) determining a best-fit function from the identified trapping voltage amplitudes and the mass-to-charge ratios of the plurality of ions types, the best-fit function having a form chosen from the group consisting of $$V_{RF}(m) = am + b + \frac{p}{(1+qm)^r}, \quad V_{RF}(m) = am + b + \frac{p}{1+(m/q)^r} \text{ and}$$

$V_{RF}(m)=am+b+p\exp(rm)$ where a, b, p, q and r are constants determined by a fitting procedure, and $V_{RF}(m)$ is an applied RF trapping voltage amplitude that is required to eject an ion having mass-to-charge ratio, m, from the ion trap mass analyzer when the ion trap mass analyzer is operated at the selected scan rate and employing the pre-determined resonant ejection voltage profile; and (c) operating the ion trap mass analyzer at the selected scan rate to analyze a sample employing the pre-determined resonant ejection voltage profile and employing the best-fit function determined in step (b) to relate applied trapping voltage to mass-to-charge ratio of detected sample ions.

19. A method of calibrating and operating an ion trap mass spectrometer as recited in claim 18, wherein the step (c) comprises performing a mass scan of the ion trap mass analyzer to analyze a sample using a trapping voltage amplitude that varies non-linearly in time such that the mass-to-charge ratio of detected ions varies linearly in time in accordance with the best-fit function determined in step (b).

20. A method of calibrating and operating an ion trap mass spectrometer as recited in claim 18, wherein the step (c) comprises:

(c1) performing a mass scan of the ion trap mass analyzer to analyze a sample using a trapping voltage amplitude that varies linearly in time; and (c2) calculating mass-to-charge ratios of sample ions detected during the mass scan using the best-fit function determined in step (b).

21. A method of calibrating the mass-axis scale of an ion trap mass spectrometer comprising the steps of:

(a) identifying, for each of a plurality of ion types produced from at least one calibrant material and having different respective mass-to-charge ratios, a trapping voltage amplitude at which ions of each respective ion type are ejected, by resonance ejection, from the ion trap mass analyzer when the ion trap mass analyzer is operated at a selected scan rate;

(b) determining a best-fit function from the identified trapping voltage amplitudes and the mass-to-charge ratios of the plurality of ion types, the best-fit function yielding an RF trapping voltage amplitude, $V_{RF}(m)$, that is required to eject an ion having mass-to-charge ratio, m, from the ion trap mass spectrometer operated at the selected scan rate; wherein said best-fit function does not have a constant first derivative over a full scanning range of the ion trap mass spectrometer; and (c) storing information representing the best-fit function derived in step (b).

22. A method of calibrating the mass-axis scale of an ion trap mass spectrometer as recited in claim 21, wherein the best-fit function has a form chosen from the group consisting of $$V_{RF}(m) = am + b + \frac{p}{(1+qm)^r},$$

$$V_{RF}(m) = am + b + \frac{p}{1+(m/q)^r}$$

or $V_{RF}(m)=am+b+p\exp(rm)$ where a, b, p, q and r are constants determined by a fitting procedure.

23. A method of calibrating the mass-axis scale of an ion trap mass spectrometer as recited in claim 21, wherein the best-fit function is piecewise linear.

24. A method of calibrating and operating an ion trap mass analyzer having a plurality of electrodes to which a main RF trapping voltage and a resonant ejection voltage are applied during operation of the ion trap mass analyzer, the method comprising steps of:

(a) selecting an analytical scan rate at which to operate the mass spectrometer;

(b) identifying, for each of a plurality of ion types produced from at least one calibrant material and having respective mass-to-charge ratios, an optimum resonant ejection voltage amplitude, $V_{reseject}$, at which a mass peak quality value is optimized when the ion trap mass analyzer is operated at the selected scan rate;

(c) determining a first set of parameter values that provide a best-fit of the identified $V_{reseject}$ values to a first function of the mass-to-charge ratios, m, the first function having a first pre-determined form;

(d) identifying, for each of a plurality of ion types produced from at least one calibrant material and having respective mass-to-charge ratios, a respective trapping voltage amplitude, $V_{RF}$, at which ions of each said ion type are ejected from the ion trap mass analyzer when the ion trap mass analyzer is operated at the selected scan rate and employing a resonant ejection voltage calculated according to the function evaluated using the first set of parameter values;

(e) determining a set of parameter values that provide a best-fit of the identified $V_{reseject}$ values to a second function of the mass-to-charge ratios, m, the second function having a second pre-determined form; and (f) storing the first and second sets of parameter values;

(g) selecting at least one additional analytical scan rate;

(h) repeating steps (b) through (f) for each selected additional analytical scan rate; and (i) determining a best fit of one or more parameters of the first set of parameter values or of one or more parameters of the second set of parameter values to a respective function of scan rate.

25. A method of calibrating and operating an ion trap mass analyzer as recited in claim 24, wherein the first function is of the form $V_{reseject}=m^c(a_r+b_r m)$ and wherein the first set of parameters comprises $a_r$, $b_r$ and c.

26. A method of calibrating and operating an ion trap mass analyzer as recited in claim 24, wherein the second function is of the form $$V_{RF}(m) = am + b + \frac{p}{(1+qm)^r}$$

and wherein the second set of parameters comprise a, b, p, q and r.

27. A method of calibrating and operating an ion trap mass analyzer as recited in claim 24, wherein the second function is of the form $$V_{RF}(m) = am + b + \frac{p}{1+(m/q)^r}$$

and wherein the second set of parameters comprise a, b, p, q and r.

28. A method of calibrating and operating an ion trap mass analyzer as recited in claim 24, wherein the second function is of the form $V_{RF}(m)=am+b+p\exp(rm)$ and wherein the second set of parameters comprise a, b, p, and r.

* * * * *